US012295042B2

(12) United States Patent
You

(10) Patent No.: US 12,295,042 B2
(45) Date of Patent: May 6, 2025

(54) COMMUNICATION METHOD AND APPARATUS

(71) Applicant: HUAWEI TECHNOLOGIES CO., LTD., Guangdong (CN)

(72) Inventor: Chunhua You, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 352 days.

(21) Appl. No.: 17/863,150

(22) Filed: Jul. 12, 2022

(65) Prior Publication Data
US 2022/0353921 A1 Nov. 3, 2022

Related U.S. Application Data

(63) Continuation of application No. PCT/CN2020/071847, filed on Jan. 13, 2020.

(51) Int. Cl.
H04W 4/00 (2018.01)
H04W 74/08 (2009.01)
H04W 74/0833 (2024.01)

(52) U.S. Cl.
CPC ... *H04W 74/0833* (2013.01); *H04W 74/0866* (2013.01)

(58) Field of Classification Search
CPC ......... H04W 74/0833; H04W 74/0866; H04W 74/0808; H04W 74/006; Y02D 30/70
See application file for complete search history.

(56) References Cited

U.S. PATENT DOCUMENTS

2020/0260485 A1* 8/2020 Lei ................ H04W 72/23
2020/0413485 A1* 12/2020 Kundu ........... H04W 72/0453
(Continued)

FOREIGN PATENT DOCUMENTS

CN 108282874 A 7/2018
CN 109548062 A 3/2019
(Continued)

OTHER PUBLICATIONS

3GPP TS 37.213 V15.2.0 (Mar. 2019), "3rd Generation Partnership Project; Technical Specification Group Radio Access Network; Physical layer procedures for shared spectrum channel access (Release 15)," Mar. 2019, 20 pages.
(Continued)

*Primary Examiner* — Thai Dinh Hoang
(74) *Attorney, Agent, or Firm* — Fish & Richardson P.C.

(57) ABSTRACT

The disclosure provides communication methods and apparatuses. One example method includes that a terminal device sends a random access request to a network device, and the terminal device receives a random access response to the random access request that comprises first configuration information from a network device. The first indication information indicates not to perform channel access or the first indication information indicates that a channel access type is channel access without random back-off or channel access with random back-off with variable size of contention window. The terminal device sends an uplink message to the network device based on the first indication information, where the uplink message is carried on a physical uplink shared channel (PUSCH) or a physical uplink control channel (PUCCH).

18 Claims, 14 Drawing Sheets

(56) References Cited

U.S. PATENT DOCUMENTS

| | | | | |
|---|---|---|---|---|
| 2021/0392680 A1* | 12/2021 | Wang | ........... | H04W 74/002 |
| 2022/0110161 A1* | 4/2022 | Christoffersson | ... | H04W 74/002 |
| 2022/0304058 A1* | 9/2022 | Wang | ........... | H04W 74/0808 |
| 2022/0346147 A1* | 10/2022 | Wang | ........... | H04W 74/0866 |

FOREIGN PATENT DOCUMENTS

| | | | | | |
|---|---|---|---|---|---|
| CN | 110446269 | A | | 11/2019 | |
| CN | 110662228 | A | | 1/2020 | |
| CN | 114467359 | A | * | 5/2022 | ............ H04W 24/08 |
| CN | 118077157 | A | * | 5/2024 | ............ H04B 7/0695 |
| EP | 4280783 | A1 | * | 11/2023 | ............ H04W 72/04 |
| TW | 202107930 | A | * | 2/2021 | .......... H04W 74/006 |
| WO | WO-2020132048 | A1 | * | 6/2020 | ............ H04W 16/14 |
| WO | WO-2020222191 | A1 | * | 11/2020 | ........ H04W 74/0833 |
| WO | WO-2022039852 | A1 | * | 2/2022 | ............ H04W 72/02 |
| WO | WO-2023223551 | A1 | * | 11/2023 | |

OTHER PUBLICATIONS

3GPP TS 38.212 V15.8.0 (Dec. 2019), "3rd Generation Partnership Project; Technical Specification Group Radio Access Network; NR; Multiplexing and channel coding (Release 15)," Dec. 2019, 101 pages.

3GPP TS 38.213 V15.8.0 (Dec. 2019), "3rd Generation Partnership Project;Technical Specification Group Radio Access Network;NR;Physical layer procedures for control(Release 15)," Dec. 2019, 109 pages.

3GPP TS 38.300 V15.8.0 (Dec. 2019), "3rd Generation Partnership Project;Technical Specification Group Radio Access Network;NR; NR and NG-RAN Overall Description;Stage 2 (Release 15)," Dec. 2019, 99 pages.

3GPP TS 38.321 V15.8.0 (Dec. 2019), "3rd Generation Partnership Project; Technical Specification Group Radio Access Network; NR; Medium Access Control (MAC) protocol specification (Release 15)," Dec. 2019, 78 pages.

Nokia et al., "On DL signals and channels," 3GPP TSG RAN WG1 Meeting #99, R1-1912279, Reno, USA, Nov. 18-22, 2019, 16 pages.

PCT International Search Report and Written Opinion issued in International Application No. PCT/CN2020/071847 on Oct. 15, 2020, 19 pages (with English translation).

Qualcomm Inc., "New WID on NR-based Access to Unlicensed Spectrum," 3GPP TSG RAN Meeting #82, RP-182878, 2Sorrento, Italy, Dec. 10-13, 2018, 8 pages.

Qualcomm Incorporated, "Summary of NR-U Agreements Till RAN1 #98," 3GPP TSG RAN WG1 Meeting #99, R1-1911721, Reno, USA, Nov. 18-22, 2019, 26 pages.

ZTE Corporation et al., "RAR MAC PDU Design for NR-U," 3GPP TSG-RAN2 Meeting #108, R2-1914793, Reno, USA, Nov. 18-22, 2019, 4 pages.

Qualcomm Incorporated, "Views on NR for Bands in 6-24GHz Range," 3GPP TSG RAN Meeting 82, RP-182398, Sorrento, Italy, Dec. 10-13, 2018, 1 page.

3GPP TR 38.889 V1.0.0, "3rd Generation Partnership Project; Technical Specification Group Radio Access Network; Study on NR-Based Access to Unlicensed Spectrum; (Release 16)," Nov. 2018, 120 pages.

Extended European Search Report in European Appln No. 20913142. 4, dated Nov. 29, 2022, 13 pages.

* cited by examiner

| 8 | 7 | 6 | 5 | 4 | 3 | 2 | 1 | |
|---|---|---|---|---|---|---|---|---|
| Reserved bit | Timing advance command |||||||  Oct 1 |
| Timing advance command |||||| Uplink grant || Oct 2 |
| Uplink grant |||||||| Oct 3 |
| Uplink grant |||||||| Oct 4 |
| Uplink grant |||||||| Oct 5 |
| TC-RNTI |||||||| Oct 6 |
| TC-RNTI |||||||| Oct 7 |

FIG. 12a

| 8 | 7 | 6 | 5 | 4 | 3 | 2 | 1 | |
|---|---|---|---|---|---|---|---|---|
| Contention resolution identifier ||||||||  Oct 1 |
| Contention resolution identifier ||||||||  Oct 2 |
| Contention resolution identifier ||||||||  Oct 3 |
| Contention resolution identifier ||||||||  Oct 4 |
| Contention resolution identifier ||||||||  Oct 5 |
| Contention resolution identifier ||||||||  Oct 6 |
| Reserved bit ||| TPC ||| HARQ feedback time sequence indication || Oct 7 |
| PUCCH resource indication |||| Timing advance command |||| Oct 8 |
| Timing advance command ||||||||  Oct 9 |
| C-RNTI ||||||||  Oct 10 |
| C-RNTI ||||||||  Oct 11 |

FIG. 12b

| 8 | 7 | 6 | 5 | 4 | 3 | 2 | 1 | |
|---|---|---|---|---|---|---|---|---|
| Contention resolution identifier ||||||||  Oct 1 |
| Contention resolution identifier ||||||||  Oct 2 |
| Contention resolution identifier ||||||||  Oct 3 |
| Contention resolution identifier ||||||||  Oct 4 |
| Contention resolution identifier ||||||||  Oct 5 |
| Contention resolution identifier ||||||||  Oct 6 |
| Reserved bit | Indication information 3 || TPC ||| HARQ feedback time sequence indication || Oct 7 |
| PUCCH resource indication |||| Timing advance command |||| Oct 8 |
| Timing advance command ||||||||  Oct 9 |
| C-RNTI ||||||||  Oct 10 |
| C-RNTI ||||||||  Oct 11 |

FIG. 12c

COMMUNICATION METHOD AND APPARATUS

CROSS-REFERENCE TO RELATED APPLICATIONS

This application is a continuation of International Application No. PCT/CN2020/071847, filed on Jan. 13, 2020, the disclosure of which is hereby incorporated by reference in its entirety.

TECHNICAL FIELD

This application relates to the field of wireless communication technologies, and in particular, to a communication method and apparatus.

BACKGROUND

A basis of wireless communication is spectrum resources. The spectrum resources may be classified into two types: a licensed spectrum and an unlicensed spectrum. The licensed spectrum can be used only by a specific operator in a place, and the unlicensed spectrum can be used by any operator and is a shared spectrum resource. Because a spectrum is shared in the unlicensed spectrum, there may be a plurality of different air interface technologies. To ensure that the different air interface technologies coexist on the unlicensed spectrum, a network device or a terminal device needs to complete channel access before performing service transmission by using the unlicensed spectrum.

In addition, the 3rd generation partnership project (3rd Generation Partnership Project, 3GPP) introduces two search space (search space, SS) groups, where each search space group may include one or more search spaces, and the search space may also be referred to as a search space set (search space set).

Therefore, when the terminal device performs communication on the unlicensed spectrum, a specific search space group from which a search space is to be selected by the terminal device for monitoring downlink control information (downlink control information, DCI) still needs to be further researched currently.

SUMMARY

In view of this, this application provides a communication method and apparatus, to determine a search space group from which a search space is to be selected for monitoring DCI.

According to a first aspect, an embodiment of this application provides a communication method. The method may be applied to a terminal device, or may be applied to a chip inside a terminal device. For example, the method is applied to the terminal device. In the method, the terminal device may receive first configuration information from a network device, where the first configuration information is for configuring a first search space and a second search space of a first frequency domain resource, and the first search space and the second search space of the first frequency domain resource are for monitoring DCI in a same format, activate the first frequency domain resource; and monitor the DCI on the first frequency domain resource based on the first search space of the first frequency domain resource.

According to the foregoing method, when the first search space and the second search space for monitoring the DCI in the same format are configured for the terminal device, if the terminal device activates the first frequency domain resource, the terminal device may use the first search space of the first frequency domain resource to perform monitoring. In other words, the terminal device may select the first search space to perform monitoring.

In a possible design, a periodicity of the first search space is less than a periodicity of the second search space.

In this way, after activating the first frequency domain resource, the terminal device performs monitoring by using the first search space, so that the terminal device can receive the DCI as early as possible, that is, communicates with the network device as early as possible. This improves resource utilization.

In a possible design, the first frequency domain resource is a first BWP.

In a possible design, that the terminal device activates the first frequency domain resource includes: The terminal device switches an activated BWP from a second BWP to the first BWP.

In a possible design, that the terminal device switches an activated BWP from a second BWP to the first BWP includes: The terminal device determines that random access needs to be initiated, and switches the activated BWP from the second BWP to the first BWP, where a random access resource is not configured for the second BWP, and a random access resource is configured for the first BWP. Alternatively, the terminal device determines that a quantity of consistent channel access failures that occur on the second BWP is greater than or equal to a first threshold, and switches the activated BWP from the second BWP to the first BWP.

In a possible design, the method further includes: The terminal device receives second configuration information from the network device, where the second configuration information is for configuring a first search space and a second search space of the second BWP, and the first search space and the second search space of the second BWP are for monitoring the DCI in the same format. Before that the terminal device switches an activated BWP from a second BWP to the first BWP, the method further includes: The terminal determines to monitor the DCI on the second BWP based on the second search space of the second BWP, and starts a timer. The terminal device stops the timer in response to the switching.

According to the foregoing method, the timer is stopped in a timely manner, so that power consumption of the terminal device is effectively reduced.

In a possible design, the first BWP and the second BWP are located in a primary component carrier of the terminal device.

In a possible design, the first frequency domain resource is a secondary component carrier of the terminal device.

In a possible design, the method further includes: The terminal device determines to perform monitoring on the secondary component carrier based on the second search space, and starts a timer. The terminal device stops the timer in response to deactivation of the secondary component carrier.

According to a second aspect, an embodiment of this application provides a communication method. The method may be applied to a terminal device, or may be applied to a chip inside a terminal device. For example, the method is applied to the terminal device. In the method, the terminal device receives configuration information from a network device, where the configuration information is for configuring a first search space and a second search space, and the first search space and the second search space are for monitoring DCI in a same format; monitors the DCI based on the first search space; and monitors the DCI based on the second search space in response to uplink transmission of the terminal device.

According to the foregoing method, after performing uplink transmission, the terminal device may switch from performing monitoring based on the first search space to performing monitoring based on the second search space, to more effectively switch between a search space group 1 and a search space group 2.

In a possible design, the uplink transmission includes at least one of the following: sending a random access request, sending information on a configured grant resource, and sending a scheduling request.

In a possible design, the method further includes: The terminal device starts a timer in response to the uplink transmission of the terminal device.

In a possible design, the method further includes: If the timer expires, the terminal device performs monitoring based on the first search space.

According to a third aspect, an embodiment of this application provides a communication method. The method may be applied to a terminal device, or may be applied to a chip inside a terminal device. For example, the method is applied to the terminal device. In the method, the terminal device sends a random access request to a network device: receives a response to the random access request, where the response includes first indication information, and for example, the first indication information indicates an uplink transmission manner; and sends an uplink message to the network device based on the first indication information, where the uplink message is carried on a PUSCH or a PUCCH.

According to the foregoing method, the terminal device may send the uplink message based on the uplink transmission manner indicated by the network device, so that the network device more flexibly performs controlling. In this way, the network device shares, with the terminal device, a transmission opportunity obtained through channel contention.

In a possible design, the first indication information indicates not to perform channel access.

In a possible design, the first indication information indicates that a channel access type is channel access without random back-off or channel access with random back-off with variable size of contention window. That the terminal device sends an uplink message to the network device based on the first indication information includes: The terminal device performs channel access based on the channel access type indicated by the first indication information, and sends the uplink message to the network device after the channel access succeeds.

In a possible design, when the channel access type is the channel access without random back-off, the first indication information further indicates a first duration or a second duration.

In a possible design, the first symbol of a time domain resource in which the uplink message is located includes cyclic prefix extension, to effectively avoid the following case: A channel is occupied by another device because the terminal device does not use the channel in a timely manner after the channel access succeeds.

In a possible design, the method further includes: The terminal device receives second indication information from the network device, where the second indication information indicates a duration of the extension.

In a possible design, the random access response includes an uplink grant and a timing advance command, where the uplink grant is for indicating an uplink resource, and the timing advance command is for indicating a timing advance.

The duration of the extension satisfies the following formula:

$$T = C*T1 - T2 - T3 \text{ or } T = C*T1 - T2.$$

T is the duration of the extension, T1 is a length of a symbol, T2 is the first duration or the second duration, and T3 is the timing advance.

According to a fourth aspect, an embodiment of this application provides a communication method. The method may be applied to a network device, or may be applied to a chip inside a network device. For example, the method is applied to the network device. In the method, the network device receives a random access request from a terminal device, and sends, to the terminal device, a response to the random access request, where the response includes first indication information, and the first indication information is used by the terminal device to send an uplink message.

Because the communication method in the fourth aspect corresponds to the communication method in the third aspect, for beneficial effects of the communication method in the fourth aspect, refer to the related descriptions of the third aspect.

In a possible design, the first indication information indicates not to perform channel access, the first indication information indicates that a channel access type is channel access without random back-off, or the first indication information indicates that a channel access type is channel access with random back-off with variable size of contention window.

In a possible design, when the channel access type is the channel access without random back-off, the first indication information further indicates a first duration or a second duration.

In a possible design, the first symbol of a time domain resource in which the uplink message is located includes cyclic prefix extension.

In a possible design, the method further includes: The network device sends second indication information to the terminal device, where the second indication information indicates a duration of the extension.

In a possible design, the random access response includes an uplink grant and a timing advance command, where the uplink grant is for indicating an uplink resource, and the timing advance command is for indicating a timing advance.

The duration of the extension satisfies the following formula:

$$T = C*T1 - T2 - T3 \text{ or } T = C*T1 - T2.$$

T is the duration of the extension, T1 is a length of a symbol, T2 is the first duration or the second duration, and T3 is the timing advance.

According to a fifth aspect, this application provides a communication apparatus. The communication apparatus may be a terminal device or a chip disposed inside a terminal device. The communication apparatus has a function for implementing the first aspect to the third aspect. For example, the communication apparatus includes corresponding modules, units, or means (means) for performing the steps in the first aspect to the third aspect. The functions, the units, or the means may be implemented by software or hardware, or may be implemented by hardware executing corresponding software.

In a possible design, the communication apparatus includes a processing unit and a communication unit. The communication unit may be configured to receive and send a signal, to implement communication between the communication apparatus and another apparatus. For example, the communication unit is configured to receive configuration information from a network device. The processing unit may be configured to perform some internal operations of the communication apparatus. Functions performed by the processing unit and the communication unit may correspond to the steps in the first aspect to the third aspect.

In a possible design, the communication apparatus includes a processor, and may further include a transceiver. The transceiver is configured to receive and send a signal, and the processor executes program instructions, to complete the method according to any one of the possible designs or implementations in the first aspect to the third aspect. The communication apparatus may further include one or more memories. The memory is configured to be coupled to the processor. The one or more memories may be integrated with the processor, or may be disposed independent of the processor. This is not limited in this application. The memory may store a necessary computer program or necessary instructions for implementing the functions in the first aspect to the third aspect. The processor may execute the computer program or the instructions stored in the memory. When the computer program or the instructions is/are executed, the communication apparatus is enabled to implement the method according to any one of the possible designs or implementations in the first aspect to the third aspect.

In a possible design, the communication apparatus includes a processor and a memory. The memory may store a necessary computer program or necessary instructions for implementing the functions in the first aspect to the third aspect. The processor may execute the computer program or the instructions stored in the memory. When the computer program or the instructions is/are executed, the communication apparatus is enabled to implement the method according to any one of the possible designs or implementations in the first aspect to the third aspect.

In a possible design, the communication apparatus includes at least one processor and an interface circuit. The at least one processor is configured to: communicate with another apparatus through the interface circuit, and perform the method according to any one of the possible designs or implementations in the first aspect to the third aspect.

According to a sixth aspect, this application provides a communication apparatus. The communication apparatus may be a network device or a chip disposed inside a network device. The communication apparatus has a function for implementing the fourth aspect. For example, the communication apparatus includes corresponding modules, units, or means for performing the steps in the fourth aspect. The functions, the units, or the means may be implemented by software or hardware, or may be implemented by hardware executing corresponding software.

In a possible design, the communication apparatus includes a processing unit and a communication unit. The communication unit may be configured to receive and send a signal, to implement communication between the communication apparatus and another apparatus. For example, the communication unit is configured to send system information to a terminal device. The processing unit may be configured to perform some internal operations of the communication apparatus. Functions performed by the processing unit and the communication unit may correspond to the steps in the fourth aspect.

In a possible design, the communication apparatus includes a processor, and may further include a transceiver. The transceiver is configured to receive and send a signal, and the processor executes program instructions, to complete the method according to any one of the possible designs or implementations in the fourth aspect. The communication apparatus may further include one or more memories. The memory is configured to be coupled to the processor. The one or more memories may be integrated with the processor, or may be disposed independent of the processor. This is not limited in this application. The memory may store a necessary computer program or necessary instructions for implementing the functions in the fourth aspect. The processor may execute the computer program or the instructions stored in the memory. When the computer program or the instructions is/are executed, the communication apparatus is enabled to implement the method according to any one of the possible designs or implementations in the fourth aspect.

In a possible design, the communication apparatus includes a processor and a memory. The memory may store a necessary computer program or necessary instructions for implementing the functions in the fourth aspect. The processor may execute the computer program or the instructions stored in the memory. When the computer program or the instructions is/are executed, the communication apparatus is enabled to implement the method according to any one of the possible designs or implementations in the fourth aspect.

In a possible design, the communication apparatus includes at least one processor and an interface circuit. The at least one processor is configured to: communicate with another apparatus through the interface circuit, and perform the method according to any one of the possible designs or implementations in the fourth aspect.

According to a seventh aspect, this application provides a computer-readable storage medium. The computer storage medium stores computer-readable instructions. When a computer reads and executes the computer-readable instructions, the computer is enabled to perform the method according to any one of the possible designs in the first aspect to the fourth aspect.

According to an eighth aspect, this application provides a computer program product. When a computer reads and executes the computer program product, the computer is enabled to perform the method according to any one of the possible designs in the first aspect to the fourth aspect.

According to a ninth aspect, this application provides a chip. The chip includes a processor. The processor is coupled to a memory, and is configured to read and execute a software program stored in the memory, to implement the method according to any one of the possible designs in the first aspect to the fourth aspect.

These aspects or other aspects of this application are clearer and more comprehensible in descriptions of the following embodiments.

BRIEF DESCRIPTION OF DRAWINGS

FIG. 12a is an example of a possible format of a fallbackRAR according to an embodiment of this application;

FIG. 12b is an example of a possible format of a successRAR according to an embodiment of this application;

FIG. 12c is another example of a possible format of a successRAR according to an embodiment of this application;

DESCRIPTION OF EMBODIMENTS

Figure 1:
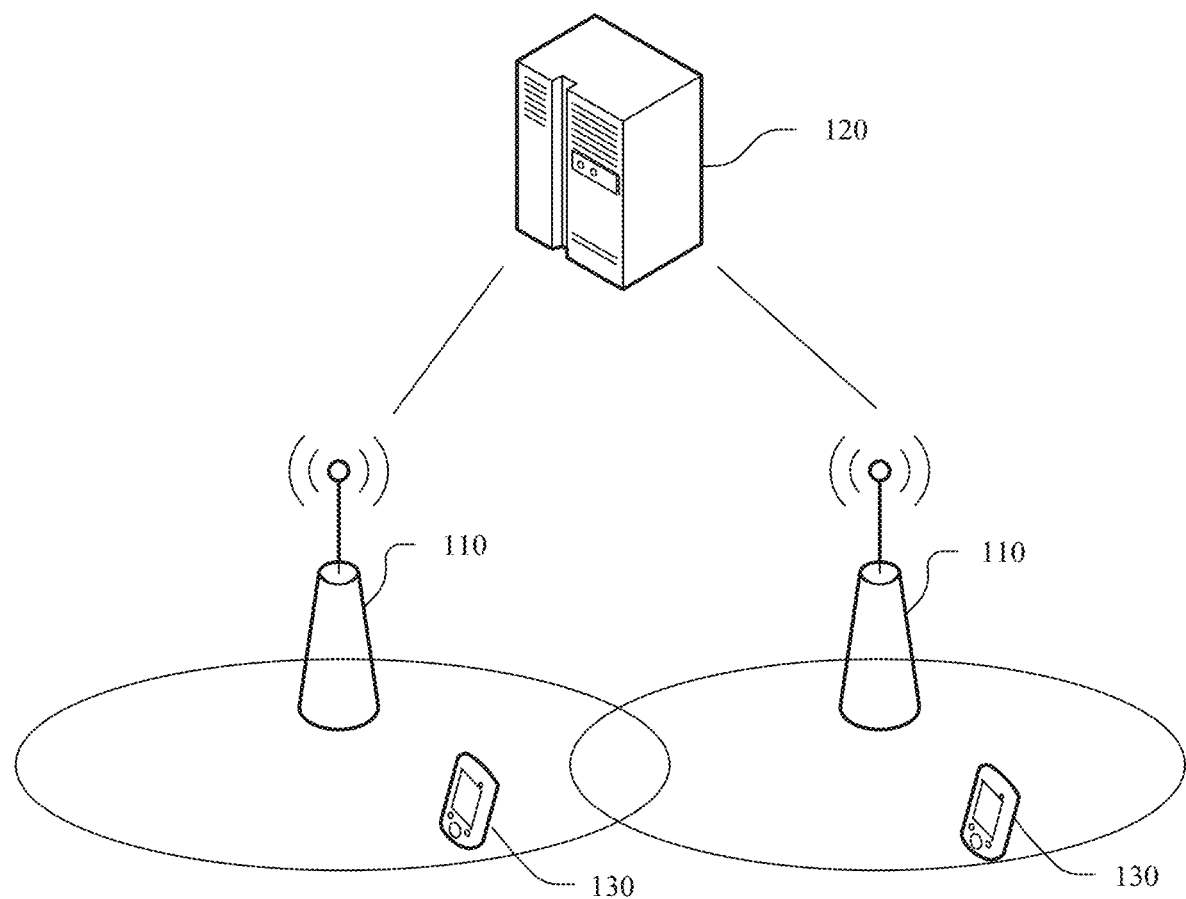
FIG. 1 is a schematic diagram of a possible system architecture to which embodiments of this application are applicable.

The following describes the technical solutions in embodiments of the present invention with reference to the accompanying drawings in embodiments of the present invention. It is clear that the described embodiments are merely some rather than all of the embodiments of the present invention.

Some terms in embodiments of this application are first described, to help a person skilled in the art have a better understanding.

(1) Terminal device. The terminal device may be a wireless terminal device that can receive scheduling information and indication information of a network device. The wireless terminal device may be a device that provides voice and/or data connectivity for a user, a handheld device with a wireless connection function, or another processing device connected to a wireless modem. The terminal device may communicate with one or more core networks or the Internet through a radio access network (radio access network, RAN). The terminal device may be a mobile terminal device, for example, a mobile telephone (or referred to as a "cellular" phone or a mobile phone (mobile phone)), a computer, or a data card, for example, may be a portable, pocket-sized, handheld, computer built-in, or vehicle-mounted mobile apparatus that exchanges voice and/or data with the radio access network. For example, the terminal device may include a personal communications service (personal communications service, PCS) phone, a cordless phone, a session initiation protocol (SIP) phone, a wireless local loop (wireless local loop, WLL) station, a personal digital assistant (personal digital assistant, PDA), a tablet computer (Pad), and a computer having wireless receiving and sending functions. The wireless terminal device may alternatively be referred to as a system, a subscriber unit (subscriber unit), a subscriber station (subscriber station), a mobile station (mobile station), a remote station (remote station), an access point (access point, AP), a remote terminal (remote terminal) device, an access terminal (access terminal) device, a user terminal (user terminal) device, a user agent (user agent), a subscriber station (subscriber station, SS), customer premises equipment (customer premises equipment, CPE), a terminal (terminal), user equipment (user equipment, UE), a mobile terminal (mobile terminal, MT), or the like. Alternatively, the terminal device may be a wearable device or a terminal device in a next generation communication system, for example, a terminal device in a 5G communication system or a terminal device in a future evolved public land mobile network (public land mobile network, PLMN).

(2) Network device: The network device may be a device in a wireless network. For example, the network device may be a radio access network (radio access network, RAN) node (or device) that enables a terminal device to access the wireless network, and may also be referred to as a base station. Currently, some examples of the RAN device are: a next generation NodeB (generation NodeB, gNodeB) in a 5G communication system, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), a wireless fidelity (wireless fidelity, Wi-Fi) access point (access point, AP), or the like. In addition, in a network structure, the network device may include a centralized unit (centralized unit, CU) node, a distributed unit (distributed unit, DU) node, or a RAN device including a CU node and a DU node. In addition, in another possible case, the network device may be another apparatus that provides a wireless communication function for the terminal device. A specific technology and a specific device form that are used by the network device are not limited in embodiments of this application. For ease of description, in embodiments of this application, an apparatus that provides a wireless communication function for a terminal device is referred to as a network device.

(3) The terms "system" and "network" may be interchangeably used in embodiments of this application. "At least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The character "/" usually indicates an "or" relationship between the associated objects. "At least one of the following items (pieces)" or a similar expression thereof indicates any combination of these items, including a single item (piece) or any combination of a plurality of items (pieces). For example, "at least one of A, B, and C" includes A, B, C, AB, AC, BC, or ABC. In addition, unless otherwise stated, ordinal numbers such as "first" and "second" in embodiments of this application are used to distinguish between a plurality of objects, and are not used to limit an order, a time sequence, priorities, or importance of the plurality of objects.

The following further describes the technical solutions of this application in detail with reference to the accompanying drawings of this specification.

FIG. 1 is a schematic diagram of a network architecture to which embodiments of this application are applicable. As shown in FIG. 1, a terminal device 130 may access a wireless network, to obtain a service of an external network (for example, the Internet) through the wireless network, or communicate with another device through the wireless network, for example, may communicate with another terminal device. The wireless network includes a radio access network (radio access network, RAN) device 110 and a core network (core network, CN) device 120. The RAN device 110 is configured to connect the terminal device 130 to the wireless network, and the CN device 120 is configured to manage the terminal device and provide a gateway for communicating with the external network. It should be understood that a quantity of devices in a communication system shown in FIG. 1 is merely used as an example. Embodiments of this application are not limited thereto. During actual application, the communication system may further include more terminal devices 130 and more RAN devices 110, and may further include another device.

A CN may include a plurality of CN devices 120. When the network architecture shown in FIG. 1 is applicable to a 5G communication system, the CN device 120 may be an access and mobility management function (access and mobility management function. AMF) entity, a session management function (session management function, SMF) entity, a user plane function (user plane function, UPF) entity, or the like. When the network architecture shown in FIG. 1 is applicable to an LTE communication system, the CN device 120 may be a mobility management entity (mobility management entity, MME), a serving gateway (serving gateway, S-GW), or the like.

Figure 2:
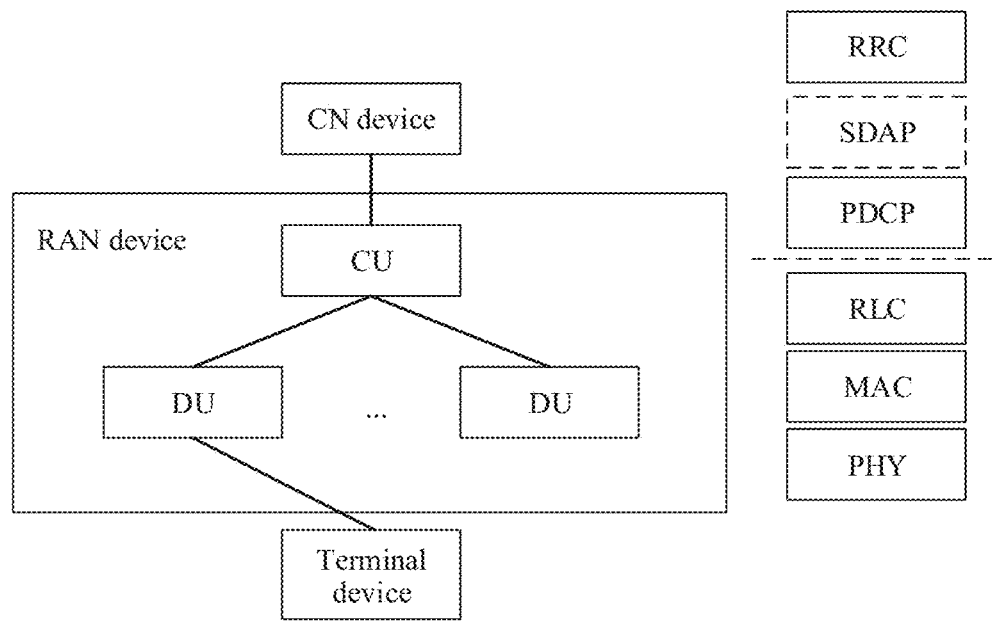
FIG. 2 is a schematic diagram of another network architecture to which embodiments of this application are applicable.

FIG. 2 is a schematic diagram of another network architecture to which embodiments of this application are applicable. As shown in FIG. 2, the network architecture includes a CN device, a RAN device, and a terminal device. The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or a part of functions are independently integrated and a part of functions are integrated into the baseband apparatus. For example, in an LTE communication system, a RAN device (eNB) includes a baseband apparatus and a radio frequency apparatus. The radio frequency apparatus may be remotely disposed relative to the baseband apparatus. For example, a remote radio unit (remote radio unit, RRU) is a remote radio unit disposed relative to a BBU.

Communication between the RAN device and the terminal device complies with a specific protocol layer structure. For example, a control plane protocol layer structure may include functions of protocol layers such as a radio resource control (radio resource control, RRC) layer, a packet data convergence protocol (packet data convergence protocol, PDCP) layer, a radio link control (radio link control. RLC) layer, a media access control (media access control, MAC) layer, and a physical layer. A user plane protocol layer structure may include the functions of the protocol layers such as the PDCP layer, the RLC layer, the MAC layer, and the physical layer. In a possible implementation, a service data adaptation protocol (service data adaptation protocol, SDAP) layer may be further included above the PDCP layer.

The RAN device may implement the functions of the protocol layers such as the RRC layer, the PDCP layer, the RLC layer, and the MAC layer through one node or a plurality of nodes. For example, in an evolved structure, the RAN device may include a CU and a DU, and a plurality of DUs may be centrally controlled by one CU. As shown in FIG. 2, the CU and the DU may be divided based on a protocol layer of a wireless network. For example, functions of the PDCP layer and a layer above the PDCP layer are set in the CU, and functions of protocol layers below the PDCP layer, such as the RLC layer and the MAC layer, are set in the DU.

Division based on the protocol layer is merely an example, and division may alternatively be performed based on another protocol layer. For example, division is performed based on the RLC layer. Functions of the RLC layer and a protocol layer above the RLC layer are set in the CU, and a function of a protocol layer below the RLC layer is set in the DU. Alternatively, division is performed at a protocol layer. For example, a part of functions of the RLC layer and a function of a protocol layer above the RLC layer are set in the CU, and a remaining function of the RLC layer and a function of a protocol layer below the RLC layer are set in the DU. In addition, division may alternatively be performed in another manner. For example, division is performed based on a latency. A function whose processing time needs to meet a latency requirement is set in the DU, and a function whose processing time does not need to meet the latency requirement is set in the CU.

In addition, the radio frequency apparatus may be independently integrated and may not be disposed in the DU, or may be integrated into the DU, or a part of the radio frequency apparatus is disposed remotely from the DU and a remaining part is integrated into the DU. This is not limited herein.

Figure 3:
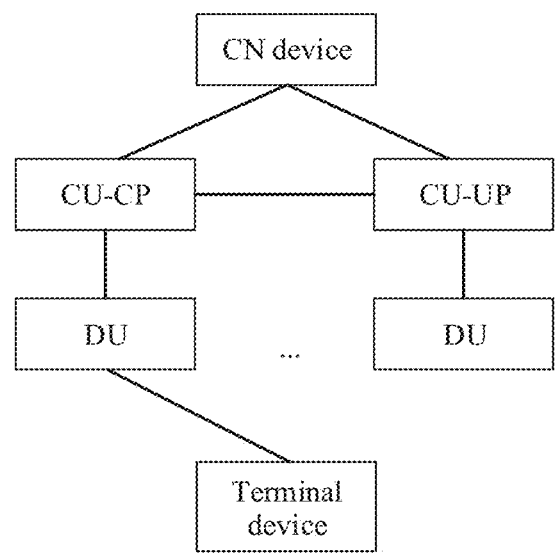
FIG. 3 is a schematic diagram of another network architecture to which embodiments of this application are applicable.

FIG. 3 is a schematic diagram of another network architecture to which embodiments of this application are applicable. Compared with the network architecture shown in FIG. 2, in the network architecture shown in FIG. 3, a control plane (CP) and a user plane (UP) that are of a CU may be alternatively separated and implemented as different entities: a control plane (control plane, CP) CU entity (namely, a CU-CP entity) and a user plane (user plane, UP) CU entity (namely, a CU-UP entity).

In the foregoing network architecture, signaling generated by the CU may be sent to a terminal device through a DU, or signaling generated by a terminal device may be sent to the CU through a DU. The DU may transparently transmit the signaling to the terminal device or the CU by directly encapsulating the signaling at a protocol layer without parsing the signaling. In the following embodiments, if transmission of such signaling between the DU and the terminal device is involved, sending or receiving of the signaling by the DU includes this scenario. For example, signaling at an RRC layer or a PDCP layer is finally processed as signaling at a PHY layer and sent to the terminal device, or is converted from received signaling at a PHY layer. In this architecture, it may also be considered that the signaling at the RRC layer or the PDCP layer is sent by the DU, or sent by the DU and a radio frequency apparatus.

The network architecture shown in FIG. 1, FIG. 2, or FIG. 3 is applicable to various communication systems of a radio access technology (radio access technology, RAT). For example, the communication system may be an LTE communication system, or may be a 5G (which is also referred to as new radio (new radio, NR)) communication system, or may be a transition system between an LTE communication system and a 5G communication system, or certainly may be a future communication system. The transition system may also be referred to as a 4.5G communication system. Network architectures and service scenarios described in embodiments of this application are intended to describe the technical solutions in embodiments of this application more clearly, and do not constitute any limitation on the technical solutions provided in embodiments of this application. A person of ordinary skill in the art may know that, with evolution of the communication network architecture and emergence of new service scenarios, the technical solutions provided in embodiments of this application are also applicable to resolving similar technical problems. An apparatus in the following embodiments of this application may be located in a terminal device or a network device based on a function implemented by the apparatus. When the foregoing CU-DU structure is used, the network device may be a CU, a DU, or a RAN device including a CU and a DU.

The following first explains and describes related technical features in embodiments of this application. It should be noted that these explanations are intended to make embodiments of this application easier to understand, but should not be considered as a limitation on the protection scope claimed in this application.

1. Channel Access Process

In the network architecture shown in FIG. 1, FIG. 2, or FIG. 3, the network device and the terminal device may communicate with each other by using a licensed spectrum (licensed spectrum), or may communicate with each other by using an unlicensed spectrum (unlicensed spectrum) (which may also be referred to as a grant-free spectrum), or may communicate with each other by using both the licensed spectrum and the unlicensed spectrum. For example, the network device and the terminal device communicate with each other by using the unlicensed spectrum. The network device or the terminal device needs to complete channel access or a channel access process before performing service transmission by using the unlicensed spectrum. The channel access process may also be referred to as a listen before talk process, which is uniformly referred to as a channel access process in embodiments of this application.

The 3GPP provides the following four channel access types (channel access types) for the channel access:

Category 1 (Cat. 1): No channel access or no LBT (No LBT). To be specific, before performing service transmission by using the unlicensed spectrum, a communication device (for example, the network device or the terminal device) may not perform channel access.

Category 2 (Cat. 2): Channel access without random back-off, or channel access based on a fixed duration, or energy detection based on a fixed duration, or LBT without random back-off (LBT without random back-off). To be specific, the communication device may detect energy (for example, an average signal strength) of a signal on an unlicensed spectrum resource within a specific spectrum range. If the energy of the signal within the fixed duration is less than a preset threshold, it is considered that a channel is in an idle state. Therefore, the communication device can occupy the channel. Otherwise, it is considered that the channel is in a busy state, and the communication device needs to contend for the channel again.

Category 3 (Cat. 3): Channel access with random back-off with fixed size of contention window, or LBT with random back-off with fixed size of contention window (LBT with random back-off with fixed size of contention window).

Category 4 (Cat. 4): Channel access with random back-off with variable size of contention window, or LBT with random back-off with variable size of contention window (LBT with random back-off with variable size of contention window), or energy detection based on a back-off mechanism. To be specific, the communication device randomly selects a value A in a contention window. After detecting at least A idle slots, the communication device may determine that a channel is in an idle state. Therefore, the communication device can occupy the channel. Otherwise, the communication device needs to contend for the channel again. The idle slot may refer to a slot in which detected energy (for example, an average signal strength) of a signal is less than a preset threshold. For example, a length of the slot may be 9 microseconds (μs), and the at least A idle slots (A*9 μs) may be consecutive or inconsecutive.

The following should be noted: (1) Because Category 3 is not standardized, Category 3 is no longer described in embodiments of this application. (2) During the energy detection in the channel access process described in Category 2 and Category 4 above, the communication device may receive signals in all directions, and then measure these signals to obtain an average signal strength. In this case, because the detection is performed based on all the directions, the channel access process may also be referred to as an omnidirectional channel access process. Alternatively, the communication device may receive signals in a part of directions, and then measure the signals in the part of directions to obtain an average signal strength in the part of directions. In this case, because the detection is performed based on the part of directions, the channel access process may also be referred to as a channel access process based on a part of directions.

The communication device performs channel access based on the channel access process described in Category 2 or Category 4. After the channel access succeeds, the communication device may perform data transmission within a specific duration. The specific duration herein may be understood as a channel occupancy time, and the channel occupancy time is related to a channel access priority class (channel access priority class, CAPC). The CAPC may be for determining a channel access parameter. For example, channel access parameters include a size of a contention window and a longest channel occupancy time (or a longest channel occupancy duration). The channel occupancy time may be less than or equal to the longest channel occupancy time.

2. Search Space

In the network architecture shown in FIG. 1, FIG. 2, or FIG. 3, the network device may send configuration information to the terminal device. The configuration information is for configuring a search space and a control resource set (control resource set, CORESET) associated with the search space. The network device further sends a downlink control channel to the terminal device on a time-frequency resource corresponding to the search space and the control resource set associated with the search space. Accordingly, after receiving the configuration information, the terminal device may monitor DCI on the time-frequency resource corresponding to the search space and the control resource set associated with the search space. In other words, the search space and the control resource set associated with the search space may be used to monitor the DCI.

The control resource set determines a frequency domain resource for transmitting the DCI. To be specific, the DCI may be transmitted on a frequency domain resource corresponding to the control resource set, and the frequency domain resource corresponding to the control resource set may include a plurality of RBs.

The search space determines a time domain resource for transmitting the DCI. The search space may be configured with some time domain information, for example, a periodicity (namely, a time interval of a resource of the search space, where a unit may be a slot), a slot offset (namely, a slot offset between a start moment of a detection periodicity and a moment when the search space is actually detected, where the slot offset is less than a value of the detection periodicity), a first time period (namely, a time period for continuously detecting the search space, where the first time period is configured by using a duration parameter and may include a plurality of slots, and a quantity of the included slots is less than the value of the detection periodicity), and a time domain start location (namely, a time domain start location corresponding to a control resource set associated with a search space in each slot).

Figure 4A:
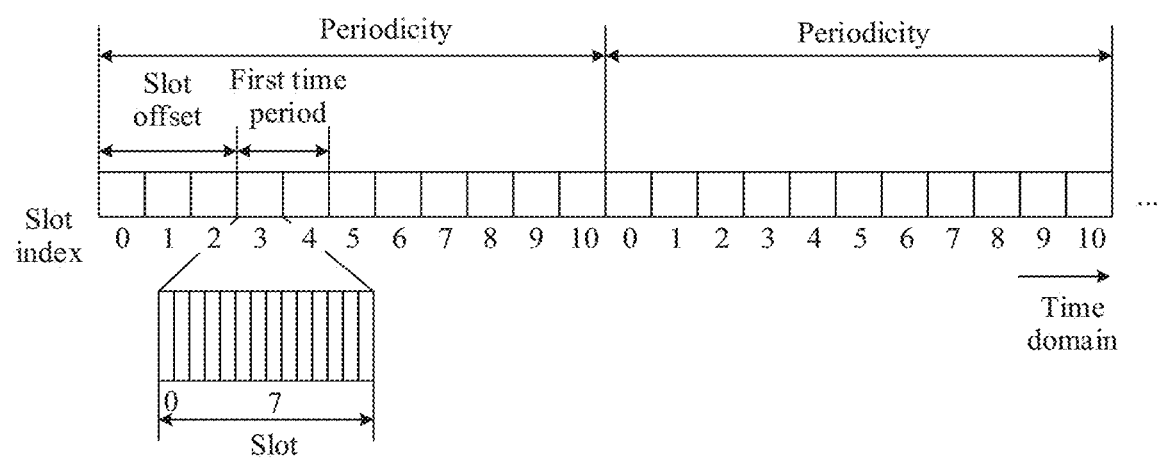
FIG. 4a is an example of parameters of a search space according to an embodiment of this application.

For ease of understanding, specific examples are used to describe meanings of various parameters. As shown in FIG. 4a, a periodicity of a search space is 10 slots, a slot offset is three slots, a first time period is two slots, time domain start locations are a symbol 0 and a symbol 7 in one slot, and a second time period of a control resource set associated with the search space is two symbols. In this example, the terminal device may detect, in a detection periodicity of every 10 slots, DCI on a symbol 0, a symbol 1, a symbol 7, and a symbol 8 in each of a slot 3 and a slot 4.

3. DCI Format

There may be a plurality of DCI formats (formats), for example, a DCI format 0_0, a DC format 0_1, a DC format 1_0, a DC format 1_1, a DC format 2_0, a DC format 2_1, a DCI format 2_2, and a DCI format 2_3. Alternatively, there may be another possible format. This is not specifically limited. The DC format 0_0/0_1/1_0/1_1 is DCI for uplink or downlink scheduling. For example, the DCI format 0_0 is for scheduling uplink data, or scheduling a physical uplink shared channel (physical uplink shared channel, PUSCH). The DCI format 1_0 is for scheduling downlink data, or scheduling a physical downlink shared channel (physical downlink shared channel, PDSCH). The DCI format 2_0/2_1/2_2/2_3 is DCI for another purpose. For example, the DCI format 2_0 is for indicating a slot format of a group of terminal side devices. Further, in the DCI for the uplink or downlink scheduling (namely, the DCI format 0_0/0_1/1_0/1_1), the first digit represents uplink or downlink scheduling, where "0" represents uplink scheduling, and "/" represents downlink scheduling: and the second digit represents fallback (fallback) or non-fallback (non-fallback), where "0" represents fallback, and "1" represents non-fallback. For example, the DCI format 1_0 is fallback DCI for scheduling a PDSCH.

The DCI in each format described above may be scrambled by using one or more types of radio network temporary identifiers (radio network temporary identifiers, RNTIs). For example, the DCI format 0_0 may be scrambled by using any one of the following RNTIs: a cell radio network temporary identifier (cell radio network temporary identifier. C-RNTI), a configured scheduling radio network temporary identifier (configured scheduling radio network temporary identifier, CS-RNTI), and a modulation and coding scheme (modulation and coding scheme, MCS) cell radio network temporary identifier (MCS-C-RNTI). For another example, the DCI format 1_0 may be scrambled by using any one of the following RNTIs: a system information (system information radio network temporary identifier, SI-RNTI), a paging radio network temporary identifier (paging radio network temporary identifier, P-RNTI), a random access radio network temporary identifier (random access radio network temporary identifier, RA-RNTI), a temporary cell radio network temporary identifier (temporary cell radio network temporary identifier, TC-RNTI), a C-RNTI, a CS-RNTI, and an MCS-C-RNTI.

4. Search Space Group

The 3GPP introduces two search space groups, which may be referred to as a search space group 1 (group 1) and a search space group 2 (group 2).

The search space group 1 may include one or more search spaces (which are referred to as search spaces A for ease of distinction). The one or more search spaces A may be for monitoring DCI in one or more formats. For example, the search space group 1 may include at least one of the following search spaces: a search space for monitoring the DCI format 0_0, a search space for monitoring the DCI format 1_0, a search space for monitoring the DCI format 0_1, a search space for monitoring the DCI format 1_1, and a search space for monitoring the DCI format 2_0.

The DCI in each format may be scrambled by using a corresponding RNTI. Therefore, it may also be understood that the one or more search spaces A may be for monitoring the DCI scrambled by using one or more RNTIs. For example, the search space group 1 may include at least one of the following search spaces: a search space for monitoring DCI scrambled by using an SI-RNTI, a search space for monitoring DCI scrambled by using an RA-RNTI, a search space for monitoring DCI scrambled by using a P-RNTI, and a search space for monitoring DCI scrambled by using a C-RNTI.

Similar to the search space group 1, the search space group 2 may also include one or more search spaces (which are referred to as search spaces B for ease of distinction). The one or more search spaces B may be for monitoring DCI in one or more formats, in other words, the one or more search spaces B may be for monitoring the DCI scrambled by using one or more RNTIs.

In an example, the search space in the search space group 1 is used by a terminal device to monitor DCI when the terminal device does not know a channel occupancy time of a network device. In other words, if the terminal device determines that the network device has not obtained the channel occupancy time, the terminal device may monitor the DCI by using the search space in the search space group 1. The search space in the search space group 2 is used by the terminal device to monitor the DCI when the terminal device knows the channel occupancy time of the network device. In other words, if the terminal device determines that the network device has obtained the channel occupancy time, the terminal device may monitor the DCI by using the search space in the search space group 2. There may be a plurality of manners in which the terminal device determines that the network device has obtained the channel occupancy time. This is not limited in embodiments of this application. After the network device performs channel access and obtains the channel occupancy time, the network device may send the DCI to the terminal device by using the search space in the search space group 1, subsequently switch to the search space group 2, and send, within the channel occupancy time of the network device, the DCI to the terminal device based on the search space in the search space group 2.

(1) Relationship Between the Search Space Group 1 and the Search Space Group 2

In embodiments of this application, the search space in the search space group 1 and the search space in the search space group 2 may be for monitoring DCI in a same format. For example, the search space group 1 includes a search space A1, a search space A2, and a search space A3, and the search space group 2 includes a search space B1, a search space B2, and a search space B3. The search space A1 and the search space B1 may be for monitoring the DCI in the same format (for example, the DCI format 0_0). The search space A2 and the search space B2 may be for monitoring the DCI in the same format (for example, the DCI format 0_1). The search space A3 and the search space B3 may be for monitoring the DCI in the same format (for example, the DCI format 1_0).

When the search space in the search space group 1 and the search space in the search space group 2 are for monitoring the DCI in the same format, the search space in the search space group 1 and the search space in the search space group 2 may be further for monitoring DCI scrambled by using a same RNTI or different RNTIs. For example, the search space A1 is for monitoring DCI (which is referred to as DCI-1) in the DCI format 0_0, and the search space B1 is also for monitoring DCI (which is referred to as DCI-2) in the DCI format 0_0. In this case, the DCI-1 and the DCI-2 may be DCI scrambled by using a same RNTI, or may be DCI scrambled by using different RNTIs.

Figure 4B:
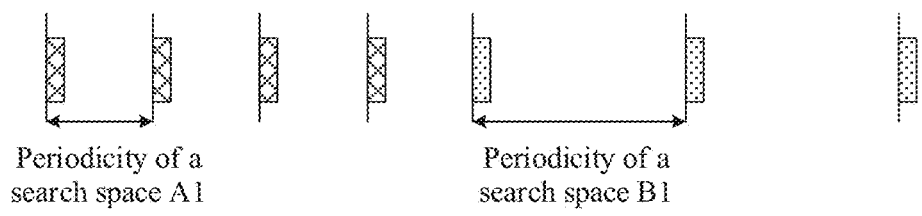
FIG. 4b is an example of a periodicity of a search space group 1 and a periodicity of a search space group 2 according to an embodiment of this application.

For example, a periodicity of the search space in the search space group 1 for monitoring the DCI in the same format may be different from a periodicity of the search space in the search space group 2 for monitoring the DCI in the same format. For example, the search space A1 and the search space B1 are for monitoring the DCI in the same format, and a periodicity of the search space A1 may be less than a periodicity of the search space B1. FIG. 4*b* is a schematic diagram in which the periodicity of the search space A1 may be less than the periodicity of the search space B1.

(2) Switching Between the Search Space Group 1 and the Search Space Group 2

When the network device configures the search space group 1 and the search space group 2 for the terminal device, the terminal device may switch between the search space group 1 and the search space group 2 based on DCI and a timer.

In an example, the network device configures, for the terminal device, a search space 1 and a search space 2 that are for monitoring the DCI format 2_0. The search space 1 is a search space in the search space group 1, and the search space 2 is a search space in the search space group 2.

In a case of this example, the network device further configures a monitoring group flag (monitoring group flag) in the DCI format 2_0, where the monitoring group flag may include one bit. If a value of the bit is 1, it indicates that the terminal device is to switch to (or keep) monitoring based on the search space in the search space group 2. Further, when the terminal device switches to monitoring based on the search space in the search space group 2, the terminal device may start the timer. If the timer expires, the terminal device may switch to monitoring based on the search space in the search space group 1. If a value of the bit is 0, it indicates that the terminal device is to switch to (or keep) monitoring based on the search space in the search space group 1.

In another case of this example, the network device does not configure a monitoring group flag in the DCI format 2_0. In this case, when the terminal device performs monitoring based on the search space in the search space group 1, and if any DCI is detected through monitoring, the terminal device may switch to monitoring based on the search space in the search space group 2, and start the timer. If the timer expires, the terminal device may switch to monitoring based on the search space in the search space group 1.

In another example, the network device does not configure, for the terminal device, the search space 1 and the search space 2 that are for monitoring the DCI format 2_0. In this case, when the terminal device performs monitoring based on the search space in the search space group 1, and if any DCI is detected through monitoring, the terminal device may switch to monitoring based on the search space in the search space group 2, and start the timer. If the timer expires, the terminal device may switch to monitoring based on the search space in the search space group 1.

(3) Configuration of the Search Space Group 1 and the Search Space Group 2

For example, the network device may configure the search space group 1 and the search space group 2 for the terminal device. There may be a plurality of specific configuration manners. The following provides descriptions with reference to different scenarios.

Scenario 1: The network device configures a plurality of bandwidth parts (bandwidth parts, BWPs) for the terminal device.

To adapt to a bandwidth capability of the terminal device, the network device may configure the BWP for the terminal device within a bandwidth supported by one component carrier (which may be referred to as a carrier bandwidth and whose value may be 10 MHz, 15 MHz, 20 MHz, 50 MHz, 100 MHz, 400 MHz, or the like), where a plurality of BWPs may be configured in the component carrier.

For example, the network device configures a BWP 1, a BWP 2, and a BWP 3 for the terminal device. In a possible manner, the network device may configure a search space group 1 and a search space group 2 for each BWP. For example, the network device may configure a search space group 1 and a search space group 2 for the BWP 1, a search space group 1 and a search space group 2 for the BWP 2, and a search space group 1 and a search space group 2 for the BWP 3. In this case, the terminal device may perform monitoring on the BWP 1 based on a search space in the search space group 1 or the search space group 2 of the BWP 1, perform monitoring on the BWP 2 based on a search space in the search space group 1 or the search space group 2 of the BWP 2, or perform monitoring on the BWP 3 based on a search space in the search space group 1 or the search space group 2 of the BWP 3.

In another possible manner, the network device may centrally configure a search space group 1 and a search space group 2. In this case, the terminal device may perform monitoring on the BWP 1, the BWP 2, or the BWP 3 based on a search space in the search space group 1 or the search space group 2.

Scenario 2: Carrier Aggregation Scenario

In the carrier aggregation scenario, a plurality of component carriers may be aggregated to serve one terminal device. Because each downlink component carrier corresponds to one independent cell, the downlink component carrier may be equivalent to the cell, and carrier aggregation may also be referred to as cell aggregation. There is a primary cell in a plurality of aggregated cells. The primary cell may be a cell to which the terminal device establishes an initial connection. Alternatively, the primary cell may be a cell to which the terminal device re-establishes an RRC connection. Alternatively, the primary cell may be a primary cell specified in a handover (handover) process or the like. The primary cell is mainly used for RRC communication with the terminal device. A component carrier corresponding to the primary cell is referred to as a primary component carrier (primary component carrier, PCC). There are one or more secondary cells in the plurality of aggregated cells. The secondary cell may be a cell in which there is no RRC communication with the terminal device, and is mainly for providing another radio resource. The secondary cell may be added during RRC reconfiguration. A component carrier corresponding to the secondary cell is referred to as a secondary component carrier (secondary component carrier, SCC).

For example, component carriers serving a terminal device include a component carrier 1, a component carrier 2, and a component carrier 3. In a possible manner, a network device may configure a search space group 1 and a search space group 2 for each component carrier. Further, for any one of the component carrier 1, the component carrier 2, and the component carrier 3, if the component carrier includes a plurality of BWPs, the network device may configure a search space group 1 and a search space group 2 for each of the plurality of BWPs, or may centrally configure a search space group 1 and a search space group 2.

Based on the foregoing descriptions of related technical features, in embodiments of this application, some implementations of communication performed by the terminal device on the unlicensed spectrum are further researched. The following implementations are researched: For example, in some possible scenarios (for example, activating a frequency domain resource), the terminal device uses a specific search space group from which a search space is to be selected for monitoring; for another example, the terminal device switches more effectively in a specific manner between the search space group 1 and the search space group 2; and for still another example, in a random access process, the terminal device sends an uplink message to the network device in a specific manner after the terminal device sends a random access request.

The following provides detailed descriptions with reference to Embodiment 1 to Embodiment 3.

Embodiment 1

In Embodiment 1, a terminal device may receive configuration information from a network device, where the configuration information is for configuring a first search space and a second search space of a first frequency domain resource, and the first search space and the second search space of the first frequency domain resource are for monitoring DCI in a same format. After activating the first frequency domain resource, the terminal device may monitor the DCI on the first frequency domain resource based on the first search space of the first frequency domain resource. The first search space may be a search space in a search space group 1, and the second search space may be a search space in a search space group 2, or vice versa. In a current solution, there is no specific manner of using a specific search space group from which a search space is to be selected for monitoring after the first search space and the second search space for monitoring the DCI in the same format are configured for the terminal device, and after the terminal device activates the first frequency domain resource. Based on this, Embodiment 1 provides a specific manner, that is, the terminal device may use the first search space of the first frequency domain resource for monitoring.

For example, a periodicity of the first search space may be less than a periodicity of the second search space. In this way, after activating the first frequency domain resource, the terminal device performs monitoring by using the first search space, so that the terminal device can receive the DCI as early as possible, that is, communicate with the network device as early as possible. This improves resource utilization. Alternatively, a periodicity of the first search space may be greater than a periodicity of the second search space. In this way, after activating the first frequency domain resource, the terminal device performs monitoring by using the first search space, to effectively reduce complexity of blind detection or monitoring performed by the terminal device, and further reduce power consumption of the terminal device.

For example, if the first search space is the search space in the search space group 2, after activating the first frequency domain resource, the terminal device may further start a timer. If the timer expires, the terminal device may switch to monitoring based on the second search space. In other words, after activating the first frequency domain resource, the terminal device may perform monitoring by using the first search space of the first frequency domain resource, and subsequently may further switch between the first search space and the second search space based on the DCI and the timer.

In this embodiment of this application, the first frequency domain resource may be a BWP or a component carrier (or a cell). The following separately describes Case 1 and Case 2.

Case 1: The first frequency domain resource is a first BWP.

Figure 5:
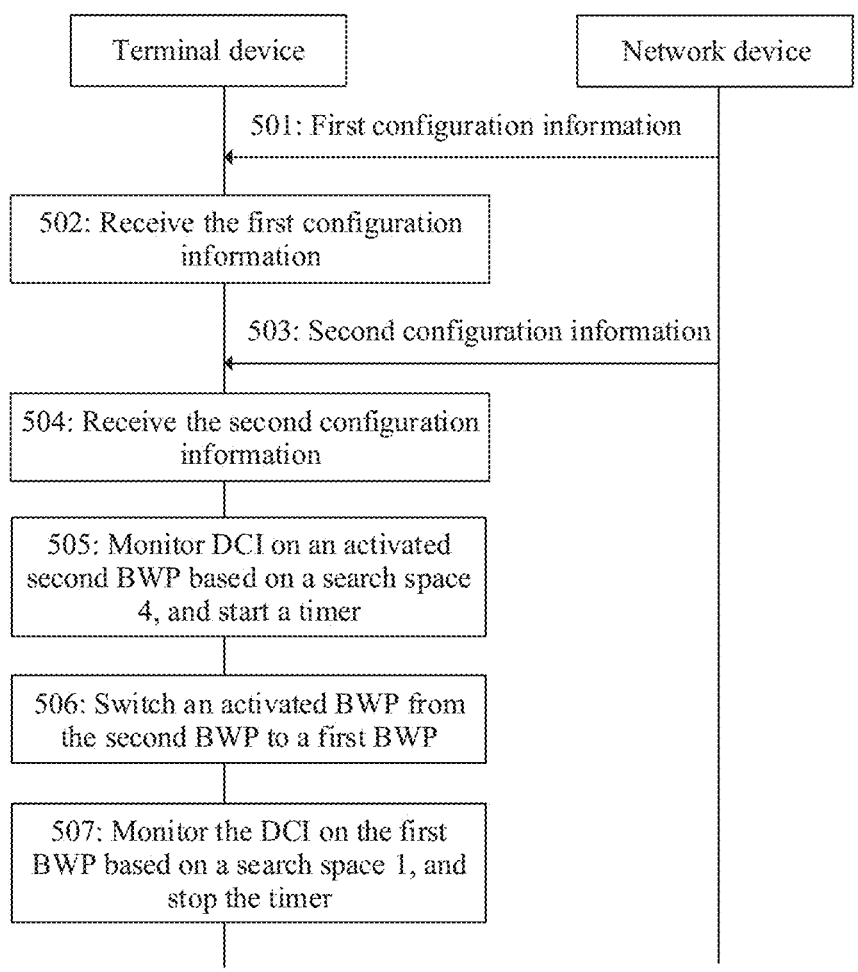
FIG. 5 is a schematic flowchart corresponding to a communication method according to Embodiment 1 of this application.
Figure 6:
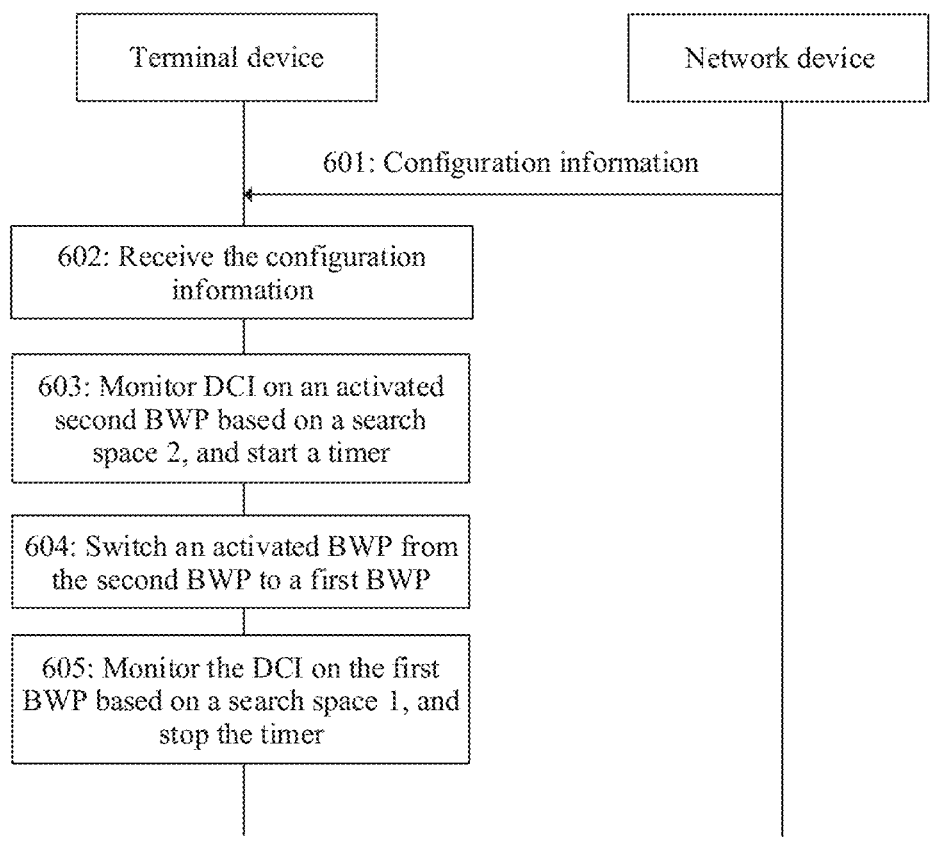
FIG. 6 is another schematic flowchart corresponding to a communication method according to Embodiment 1 of this application.

Based on Case 1, the following describes two possible implementation procedures with reference to FIG. 5 and FIG. 6.

FIG. 5 is a schematic flowchart corresponding to a communication method according to Embodiment 1 of this application. As shown in FIG. 5, the method includes the following steps.

Step 501: A network device sends first configuration information to a terminal device, where the first configuration information is for configuring a search space 1 and a search space 2 of a first BWP, in other words, the first configuration information is for configuring the search space 1 and the search space 2 for the first BWP.

The first configuration information herein may be for configuring a search space group 1 and a search space group 2 for the first BWP. For example, the search space 1 is a search space in the search space group 1, and the search space 2 is a search space in the search space group 2.

For example, the search space 1 and the search space 2 may be for monitoring DCI in a same format. For example, the search space 1 and the search space 2 are for monitoring a DCI format 1.

Accordingly, in step 502, the terminal device receives the first configuration information.

Step 503: The network device sends second configuration information to the terminal device, where the second configuration information is for configuring a search space 3 and a search space 4 of a second BWP.

The second configuration information herein may be for configuring a search space group 1 and a search space group 2 for the second BWP. For example, the search space 3 is a search space in the search space group 1, and the search space 4 is a search space in the search space group 2.

For example, the search space 3 and the search space 4 may be for monitoring DCI in a same format. For example, the search space 3 and the search space 4 are for monitoring a DCI format 2.

In an example, the DCI format 2 and the DCI format 1 may be a same DCI format.

Accordingly, in step 504, the terminal device receives the second configuration information.

Step 505: The terminal device monitors the DCI on the activated second BWP based on the search space 4.

Optionally, the terminal device may further start a timer.

For example, the terminal device monitors the DCI on the second BWP based on the search space 3, and detects a DCI format 2_0 through monitoring. If a value of a monitoring group flag in the DCI format 2_0 is 1, the terminal device may switch to monitoring the DCI based on the search space 4, and start the timer. It may be understood that "switching to monitoring the DCI based on the search space 4" and "starting the timer" may be simultaneously performed.

Step 506: The terminal device switches an activated BWP from the second BWP to the first BWP.

The terminal device may switch the activated BWP from the second BWP to the first BWP in a plurality of possible cases. For example, the terminal device determines that random access needs to be initiated, where a random access resource is not configured for the second BWP, and a random access resource is configured for the first BWP. Therefore, the terminal device may switch the activated BWP from the second BWP to the first BWP, to initiate random access on the first BWP. In this case, the first BWP may be an initial BWP of the terminal device, namely, a BWP for initiating initial access or another dedicated BWP. The random access resource may be a random access resource in a four-step random access process or may be a random access resource in a two-step random access process. For another example, the terminal device determines that consistent LBT failures (consistent LBT failures) occur on the second BWP, for example, a quantity of consistent channel access failures is greater than or equal to a first threshold, and then the terminal device may switch the activated BWP from the second BWP to the first BWP. The first threshold may be specified in a protocol, or may be configured by the network device for the terminal device.

For example, if component carriers serving the terminal device include a primary component carrier and a secondary component carrier, both the first BWP and the second BWP may be located in the primary component carrier, or both the first BWP and the second BWP may be located in the secondary component carrier.

Step 507: The terminal device monitors the DCI on the first BWP based on the search space 1.

Optionally, the terminal device may further stop the timer.

For example, "switching the activated BWP from the second BWP to the first BWP" and "stopping the timer" may be simultaneously performed.

It can be learned from step 505 to step 507 that, after switching the activated BWP from the second BWP to the first BWP, the terminal device switches from monitoring the DCI based on the search space in the search space group 2 of the second BWP to monitoring the DCI based on the search space in the search space group 1 of the first BWP. In another possible example, in step 505, if the terminal device monitors the DCI on the second BWP based on the search space in the search space group 1 of the second BWP, after switching the activated BWP from the second BWP to the first BWP, the terminal device may switch from monitoring the DCI based on the search space in the search space group 1 of the second BWP to monitoring the DCI based on the search space in the search space group 1 of the first BWP.

According to the foregoing method, the network device configures a search space group 1 and a search space group 2 for each BWP. Different BWPs correspond to different frequency ranges, and channel access in the different frequency ranges is independent of each other and does not affect each other. Therefore, after switching from the second BWP to the first BWP, the terminal device may receive corresponding DCI on the first BWP based on a search space with a shorter periodicity in the search space group 1, to improve a DCI transmission success rate.

FIG. 6 is another schematic flowchart corresponding to a communication method according to Embodiment 1 of this application. As shown in FIG. 6, the method includes the following steps.

Step 601: A network device sends configuration information to a terminal device, where the configuration information is for configuring a search space 1 and a search space 2, and the search space 1 and the search space 2 may be for monitoring DCI in a same format.

The configuration information herein may be for centrally configuring a search space group 1 and a search space group 2 for a plurality of BWPs. For example, the search space 1 is a search space in the search space group 1, and the search space 2 is a search space in the search space group 2. The plurality of BWPs may include a first BWP and a second BWP.

Accordingly, in step 602, the terminal device receives the configuration information.

Step 603: The terminal device monitors the DCI on the activated second BWP based on the search space 2.

Optionally, the terminal device may further start a timer.

Step 604: The terminal device switches an activated BWP from the second BWP to the first BWP.

Step 605: The terminal device monitors the DCI on the first BWP based on the search space 1.

Optionally, the terminal device may further stop the timer.

It can be learned from step 603 to step 605 that, after switching the activated BWP from the second BWP to the first BWP, the terminal device switches from monitoring the DCI based on the search space in the search space group 2 to monitoring the DCI based on the search space in the search space group 1. In another possible example, in step 603, if the terminal device monitors the DCI on the second BWP based on the search space in the search space group 1, after switching the activated BWP from the second BWP to the first BWP, the terminal device may continue to monitor the DCI on the first BWP based on the search space in the search space group 1.

According to the foregoing method, the network device centrally configures the search space group 1 and the search space group 2 for the first BWP and the second BWP. After switching a BWP, the terminal device may receive corresponding DCI based on a search space with a shorter periodicity in the search space group 1, to improve a DCI transmission success rate.

The following should be noted: (1) In the procedure shown in FIG. 6, if component carriers serving the terminal device include a primary component carrier and a secondary component carrier, the first BWP and the second BWP may be located in the primary component carrier, or may be located in the secondary component carrier. Further, BWP switching in the secondary component carrier may be indicated by the network device. For example, the network device indicates the BWP switching by using DCI. Therefore, if the network device further indicates, when indicating the BWP switching, to use a specific search space group from which a search space is to be selected for monitoring DCI on a switched BWP, the method described in FIG. 6 may no longer be used. (2) A difference between the procedure shown in FIG. 6 and the procedure shown in FIG. 5 lies in: The network device centrally configures the search space group 1 and the search space group 2 in FIG. 6, and the network device configures the search space group 1 and the search space group 2 for each BWP in FIG. 5. For content other than the difference, mutual reference may be made to the two procedures.

Case 2: The first frequency domain resource is a secondary component carrier.

Figure 7:
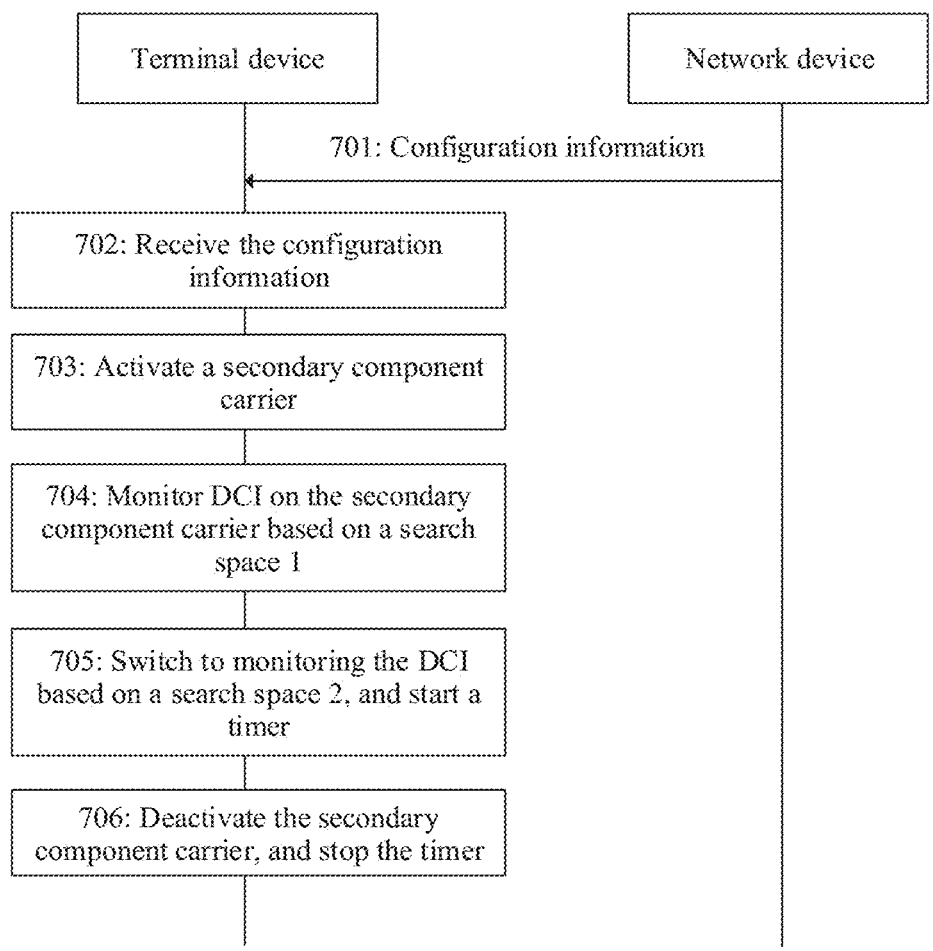
FIG. 7 is another schematic flowchart corresponding to a communication method according to Embodiment 1 of this application.

Based on Case 2, the following describes two possible implementation procedures with reference to FIG. 7.

FIG. 7 is another schematic flowchart corresponding to a communication method according to Embodiment 1 of this application. As shown in FIG. 7, the method includes the following steps.

Step 701: A network device sends configuration information to a terminal device, where the configuration information is for configuring a search space 1 and a search space 2 of a secondary component carrier, and the search space 1 and the search space 2 may be for monitoring DCI in a same format.

The configuration information herein may be for configuring a search space group 1 and a search space group 2 of the secondary component carrier. For example, the search space 1 is a search space in the search space group 1, and the search space 2 is a search space in the search space group 2.

Accordingly, in step 702, the terminal device receives the configuration information.

Step 703: The terminal device activates the secondary component carrier.

Herein, the terminal device may activate the secondary component carrier in a plurality of manners. For example, the terminal device receives indication information from the network device, and then activates the secondary component carrier based on the indication information.

Step 704: The terminal device monitors the DCI on the secondary component carrier based on the search space 1.

For example, the method may further include the following steps.

Step 705: The terminal device switches to monitoring the DCI on the secondary component carrier based on the search space 2, and starts a timer.

For example, the terminal device monitors the DCI on the secondary component carrier based on the search space 1, and detects a DCI format 2_0 through monitoring. If a value of a monitoring group flag in the DCI format 2_0 is 1, the terminal device may switch to monitoring the DCI based on the search space 2, and start the timer.

Step 706: The terminal device deactivates the secondary component carrier, and stops the timer.

According to the foregoing method, after activating the secondary component carrier, the terminal device may first receive corresponding DCI based on a search space with a shorter periodicity in the search space group 1, to communicate with the network device on the secondary component carrier as early as possible. Further, the terminal device may switch between the search space group 1 and the search space group 2 on the secondary component carrier based on the DCI and the timer. Further, after deactivating the secondary component carrier, the terminal device may stop the timer, to reduce power consumption of the terminal device.

Embodiment 2

In Embodiment 2, a terminal device receives configuration information from a network device, where the configuration information is for configuring a first search space and a second search space, and the first search space and the second search space are for monitoring DCI in a same format. The terminal device performs monitoring based on the first search space. The terminal device performs monitoring based on the second search space in response to uplink transmission of the terminal device. The first search space may be a search space in a search space group 1, and the second search space may be a search space in a search space group 2. In a current solution, the terminal device switches between the first search space and the second search space based on DCI and a timer. In Solution 2, this embodiment of this application further provides another possible switching manner. To be specific, after performing uplink transmission, the terminal device may switch from monitoring based on the first search space to monitoring based on the second search space, to more effectively switch between the search space group 1 and the search space group 2.

In Solution 2, for example, before performing uplink transmission, the terminal device needs to perform channel access. If the channel access succeeds, the terminal device may obtain a channel occupancy time, and may perform uplink transmission within the channel occupancy time. The terminal device may further share the channel occupancy time with the network device, so that the network device may send the DCI by using the second search space, and the terminal device may monitor the DCI based on the second search space. When a periodicity of the first search space is less than a periodicity of the second search space, the terminal device performs monitoring by using the second search space after performing uplink transmission, to effectively reduce complexity of blind detection or monitoring performed by the terminal device, and further reduce power consumption of the terminal device.

Figure 8:
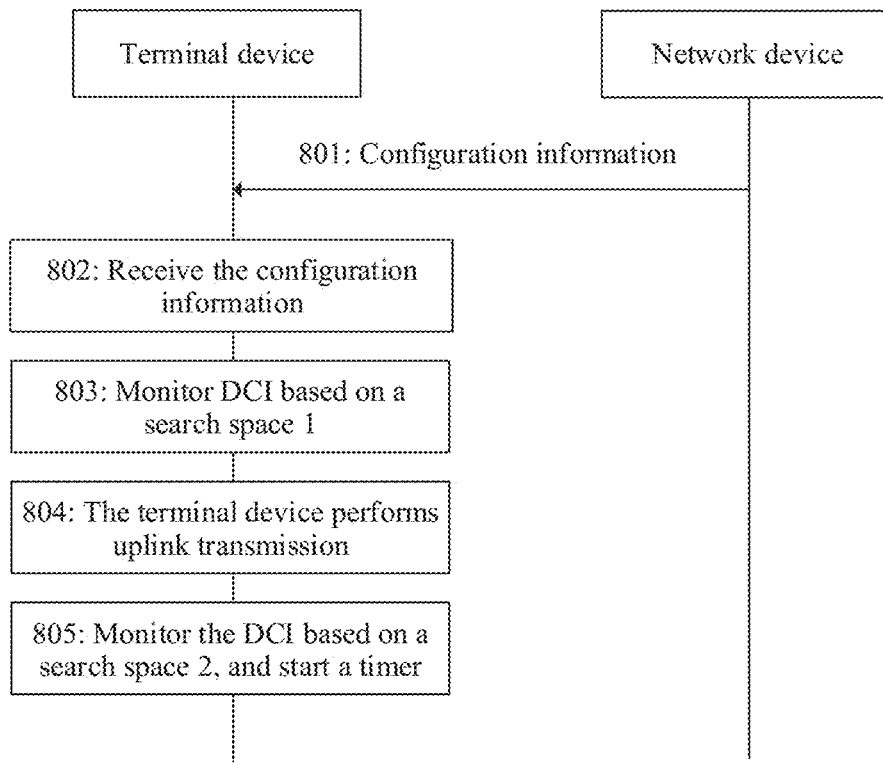
FIG. 8 is a schematic flowchart corresponding to a communication method according to Embodiment 2 of this application.

The following describes a possible implementation procedure with reference to FIG. 8.

FIG. 8 is a schematic flowchart corresponding to a communication method according to Embodiment 2 of this application. As shown in FIG. 8, the method includes the following steps.

Step 801: A network device sends configuration information to a terminal device, where the configuration information is for configuring a search space 1 and a search space 2, and the search space 1 and the search space 2 may be for monitoring DCI in a same format.

The configuration information herein may be for configuring a search space group 1 and a search space group 2 of a secondary component carrier. For example, the search space 1 is a search space in the search space group 1, and the search space 2 is a search space in the search space group 2.

Accordingly, in step 802, the terminal device receives the configuration information.

Step 803: The terminal device monitors the DCI based on the search space 1.

Step 804: The terminal device performs uplink transmission.

In an example, that the terminal device performs uplink transmission may be as follows: The terminal device sends a random access request, where the random access request may include a random access preamble.

In another example, that the terminal device performs uplink transmission may be as follows: The terminal device sends information on a configured grant (configured grant, CG) resource. The configured grant resource may be a periodic PUSCH resource pre-configured by the network device. Therefore, when the terminal device needs to send a data packet, the terminal device may send the data packet by using the pre-configured resource. The data packet may be a newly transmitted data packet, or may be a retransmitted data packet.

In still another example, that the terminal device performs uplink transmission may be as follows: The terminal device sends a scheduling request (scheduling request, SR). For example, if the terminal device determines that a data packet needs to be sent, the terminal device may first send the SR to the network device on a configured physical uplink control channel (physical uplink control channel, PUCCH) resource. Accordingly, after receiving the SR, the network device schedules a first resource for the terminal device, so that the terminal device sends the data packet on the first resource.

Step 805: The terminal device monitors the DCI based on the search space 2.

Optionally, the terminal device may further start a timer. For example, the terminal device may start the timer on a symbol next to the last symbol occupied by the uplink transmission.

For example, after the timer expires, the terminal device may switch to monitoring the DCI based on the search space 1.

It can be learned from step 803 to step 805 that, after performing uplink transmission, the terminal device may switch from monitoring the DCI based on the search space in the search space group 1 to monitoring the DCI based on the search space in the search space group 2, and start the timer. In another possible example, in step 803, if the terminal device monitors the DCI based on the search space in the search space group 2, after performing uplink transmission, the terminal device may continue to monitor the DCI based on the search space in the search space group 2. According to the foregoing method, after performing uplink transmission, the terminal device may switch to receiving corresponding DCI based on a search space with a longer periodicity in the search space group 2, to effectively reduce complexity of blind detection performed by the terminal device, and reduce power consumption of the terminal device.

Embodiment 3

In Embodiment 3, a terminal device may send a random access request to a network device, and receive a response to the random access request, where the response includes indication information, and the indication information may indicate an uplink transmission manner. In this way, the terminal device may send an uplink message to the network device based on the indication information. In this manner, the terminal device may send the uplink message based on the uplink transmission manner indicated by the network device, so that the network device more flexibly performs controlling. In this way, the network device shares, with the terminal device, a transmission opportunity obtained through channel contention.

For example, this embodiment of this application provides two random access processes: a four-step random access process and a two-step random access process. The random access request may be a message 1 in the four-step random access process, or may be a message A in the two-step random access process. The response to the random access request may be a message 2 in the four-step random access process, or may be a message B in the two-step random access process. The following separately describes Case 1 and Case 2.

Case 1: The random access process is the four-step random access process.

Figure 9:
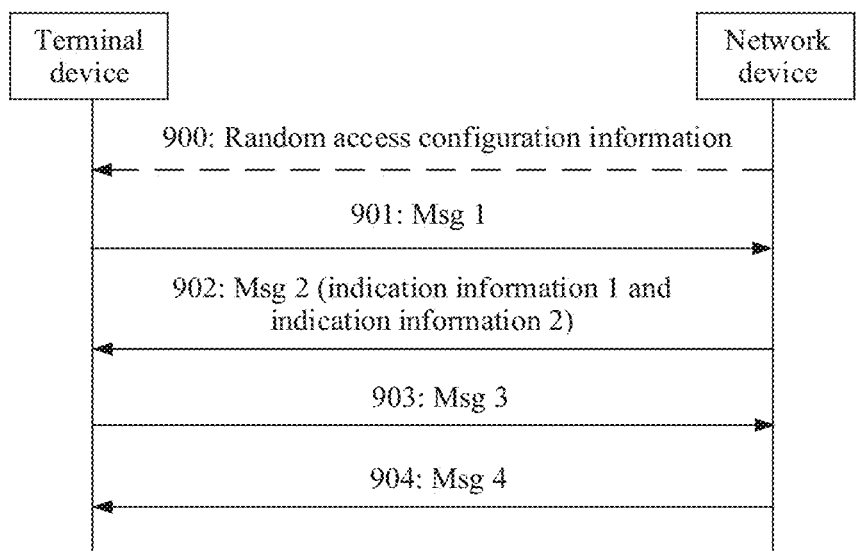
FIG. 9 is a schematic flowchart corresponding to a communication method according to Embodiment 3 of this application.

The following describes a possible implementation procedure with reference to FIG. 9.

FIG. 9 is a schematic flowchart corresponding to a communication method according to Embodiment 3 of this application. As shown in FIG. 9, the method includes the following steps.

Step 900: A network device sends random access configuration information to a terminal device, and the terminal device may receive the random access configuration information from the network device. This step may be used to make preparations before a random access process, and does not belong to steps included in the random access process. Herein, the random access configuration information may be for configuring a random access parameter, and the random access parameter may include a random access preamble set.

Step 901: The terminal device sends a random access request to the network device, where the random access request may be carried on a physical random access channel (physical random access channel, PRACH), and the random access request may include a random access preamble. Accordingly, the network device receives the random access preamble from the terminal device. The random access request is also referred to as a first message or a message 1 (Msg 1) in the random access process.

In an example, the random access preamble sent by the terminal device to the network device may be a random access preamble selected by the terminal device from the random access preamble set that is for random access and that is obtained in step 900.

Step 902: After detecting the random access preamble sent by the terminal device, the network device sends a random access response (random access response, RAR) to the terminal device, and the terminal device receives the random access response from the network device, where the random access response is also referred to as a second message or a message 2 (Msg 2) in the random access process.

For example, after detecting a random access time-frequency resource for sending the preamble, the network device may calculate an RA-RNTI (where generation of the RA-RNTI is related to the time-frequency resource used by the terminal device to send the preamble), and the network device scrambles DCI by using the RA-RNTI. The network device sends, to the terminal device, response information for the preamble, and the terminal device learns of information about the time-frequency resource for sending the preamble by the terminal device, and may also calculate an RA-RNTI, so that the terminal device may monitor DCI (where the DCI is for scheduling a PDSCH that carries the Msg 2) on a PDCCH by using the RA-RNTI, and receive, based on DCI detected through monitoring, the Msg 2 carried on the PDSCH.

In this embodiment of this application, the Msg 2 may include a timing advance command (timing advance command, TAC), an uplink (uplink, UL) grant (grant), and a TC-RNTI. The timing advance command is for indicating a timing advance, and a value of the timing advance may be greater than or equal to 0. The uplink grant is for indicating an uplink resource allocated by the network device to the terminal device.

For example, the Msg 2 may further include indication information 1. The indication information 1 indicates an uplink transmission manner, in other words, the indication information 1 indicates a channel access type (for example, a channel access type of channel access performed by the terminal device before the terminal device sends a message 3). For example, the indication information 1 may indicate that the channel access type is Category 1, or the indication information 1 may indicate that the channel access type is Category 2, or the indication information 1 may indicate that the channel access type is Category 4. When the indication information 1 may indicate that the channel access type is Category 2, the indication information 1 may further indicate a fixed duration, for example, a first duration or a second duration. The first duration may be 16 µs, and the second duration may be 25 µs.

The indication information 1 may be determined by the network device based on an uplink-downlink switching time between the network device and the terminal device and/or a channel occupancy time of the network device. The uplink-downlink switching time may be understood as a guard interval required for switching from downlink transmission to uplink transmission (or switching from uplink transmission to downlink transmission), to avoid interference between the downlink transmission and the uplink transmission. For example, the uplink-downlink switching time between the network device and the terminal device may be determined by the network device based on a distance between the network device and the terminal device. This is not specifically limited.

Figure 10A:
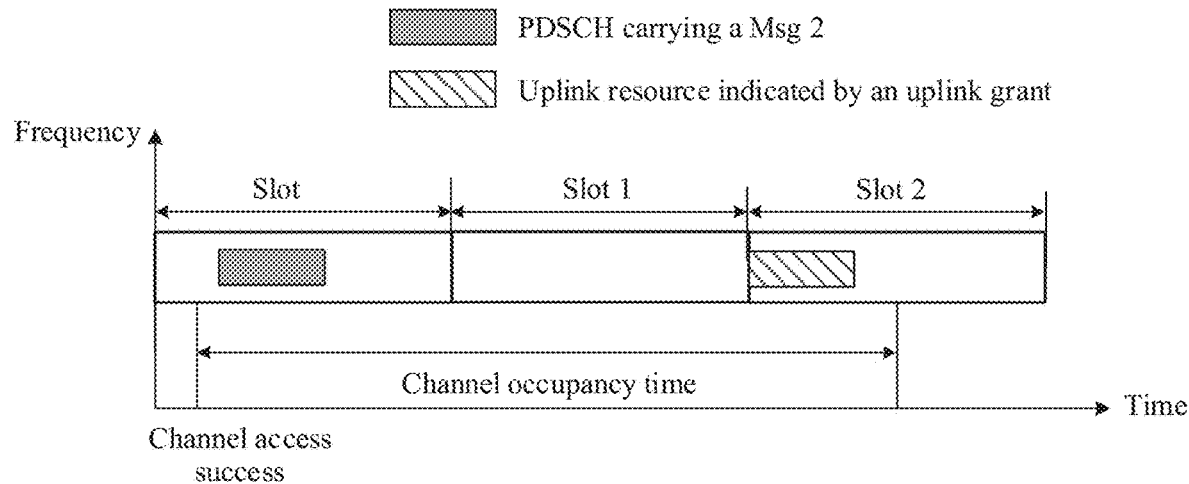
FIG. 10a is a schematic diagram in which a network device may share a transmission opportunity with a terminal device according to an embodiment of this application.
Figure 10B:
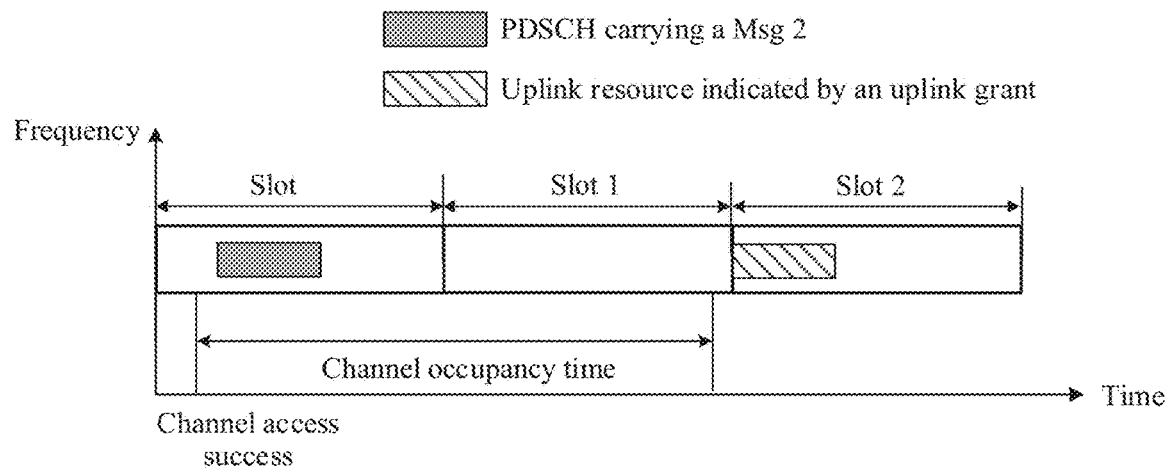
FIG. 10b is a schematic diagram in which a network device has no remaining transmission opportunity available according to an embodiment of this application.

For example, the network device determines the indication information 1 based on the uplink-downlink switching time and the channel occupancy time of the network device. The network device may determine the indication information 1 based on the uplink-downlink switching time and the channel occupancy time of the network device in a plurality of manners. In a possible implementation, the network device may first perform channel access before sending the message 2, and may send the message 2 within the channel occupancy time after the channel access succeeds. Refer to FIG. 10*a*. If determining that a transmission opportunity can be shared with the terminal device (that is, an end location of the channel occupancy time of the network device is after an end location of the uplink resource indicated by the uplink grant, or an end location of the channel occupancy time of the network device is the same as an end location of the uplink resource indicated by the uplink grant), the network device may determine, based on the uplink-downlink switching time, the channel access type indicated by the indication information 1. For example, if determining that the uplink-downlink switching time is less than or equal to the first duration, the network device may determine that the channel access type indicated by the indication information 1 is Category 1. If determining that the uplink-downlink switching time is greater than the first duration and is less than or equal to the second duration, the network device may determine that the channel access type indicated by the indication information 1 is Category 2, and the indication information 1 may further indicate that the fixed duration is the first duration. If determining that the uplink-downlink switching time is greater than the second duration, the network device may determine that the channel access type indicated by the indication information 1 is Category 2, and the indication information 1 may further indicate that the fixed duration is the second duration. Refer to FIG. 10*b*. If determining that there is no remaining transmission opportunity available (that is, the end location of the channel occupancy time of the network device is before the end location of the uplink resource indicated by the uplink grant), the network device may determine that the channel access type indicated by the indication information 1 is Category 4.

For example, the first symbol of the uplink resource indicated by the uplink grant may further include cyclic prefix (cyclic prefix, CP) extension (extension). The Msg 2 may further include indication information 2, and the indication information 2 indicates a duration of the extension. The duration of the extension may be related to the channel access type indicated by the indication information 1.

For example, the duration, indicated by the indication information 2, of the extension may satisfy the following formula:

$$T=C*T1-T2-T3 \text{ or } T=C*T1-T2.$$

T is the duration of the extension, C is an integer, T1 is a length of a symbol, namely, a symbol length (symbol length), T2 is the first duration or the second duration, and T is the timing advance. For example, a value of C may be predefined in a protocol, or may be determined by the network device and sent by the network device to the terminal device. This is not specifically limited. Units of T1, T2, and T3 are the same, for example, µs.

It should be noted that, in this embodiment of this application, the indication information 1 and the indication information 2 may respectively indicate the channel access type and the duration of the extension. Alternatively, in an optional solution, the channel access type and the duration of the extension may be jointly indicated or simultaneously indicated. In this case, the indication information 1 and the indication information 2 may be understood as same indication information (which is referred to as indication information 3 for ease of description). In other words, the Msg 2 may include the indication information 3, and the indication information 3 may indicate the channel access type and the duration of the extension. Alternatively, in another optional solution, because the duration of the extension is related to the channel access type, a mapping relationship between an index of a duration of extension and a channel access type may be preset, so that the network device may implicitly indicate the duration of the extension. For example, the network device indicates a channel access type to the terminal device, and the terminal device may determine a duration of extension based on the channel access type and the mapping relationship.

The following uses an example in which the channel access type and the duration of the extension are jointly indicated. In an example, the indication information 3 may include two bits. For example, Table 1 shows a possible example in which the indication information 3 indicates the channel access type and the duration of the extension.

TABLE 1

Example in which the indication information 3 indicates the
channel access type and the duration of the extension

| Indication information 3 | Channel Access type | Duration of extension |
|---|---|---|
| 00 | Cat. 1 (16 μs) | C2 * symbol length − 16 μs − TA |
| 01 | Cat. 2 (25 μs) | C3 * symbol length − 25 μs − TA |
| 10 | Cat. 2 (25 μs) | C1 * symbol length − 25 μs |
| 11 | Cat. 4 | 0 |

In Table 1, when values of the two bits included in the indication information 3 are '00', it indicates that the channel access type is Category 1, and the duration of the extension is C2*symbol length—16 μs—TA. When the values of the two bits are '01', it indicates that the channel access type is Category 2 (where the fixed duration is the second duration, namely, 25 μs), and the duration of the extension is C3*symbol length—25 μs—TA. When the values of the two bits are '10', it indicates that the channel access type is Category 2 (where the fixed duration is the second duration, namely, 25 μs), and the duration of the extension is C1*symbol length—25 μs. When the values of the two bits are '11', it indicates that the channel access type is Category 4, and the duration of the extension is 0. C1, C2, and C3 are all integers, and values of C1, C2, and C3 are not limited in this embodiment of this application. For example, C1 may be predefined in a protocol, and C2 or C3 may be determined by the network device and sent by the network device to the terminal device. TA in Table 1 represents the timing advance.

For another example, Table 2 shows another possible example in which the indication information 3 indicates the channel access type and the duration of the extension.

TABLE 2

Another example in which the indication information 3 indicates
the channel access type and the duration of the extension

| Indication information 3 | Channel Access type | Duration of extension |
|---|---|---|
| 00 | Cat. 1 (16 μs) | C2 * symbol length − 16 μs − TA |
| 01 | Cat. 2 (16 μs) | C3 * symbol length − 16 μs − TA |
| 10 | Cat. 2 (25 μs) | C1 * symbol length − 25 μs |
| 11 | Cat. 4 | 0 |

In Table 2, when values of the two bits included in the indication information 3 are '01', it indicates that the channel access type is Category 2 (where the fixed duration is the first duration, namely, 16 μs), and the duration of the extension is C3*symbol length—16 μs—TA. When the values of the two bits are '00', '10', or '11', refer to the related descriptions in Table 1.

Step 903: The terminal device sends an uplink message to the network device based on the Msg 2, where the uplink message may be carried on a physical uplink shared channel (physical uplink shared channel, PUSCH). Accordingly, the network device receives the uplink message from the terminal device. The uplink message is also referred to as a third message or a message 3 (Msg 3) in the random access process.

For example, Table 1 is used as an example. If the terminal device determines that the values of the two bits in the indication information 3 in the Msg 2 are '00', the terminal device may not perform channel access, and may determine the duration of the extension based on C2*symbol length—16 μs—TA, to send the uplink message on the extension and the uplink resource.

Figure 10C:
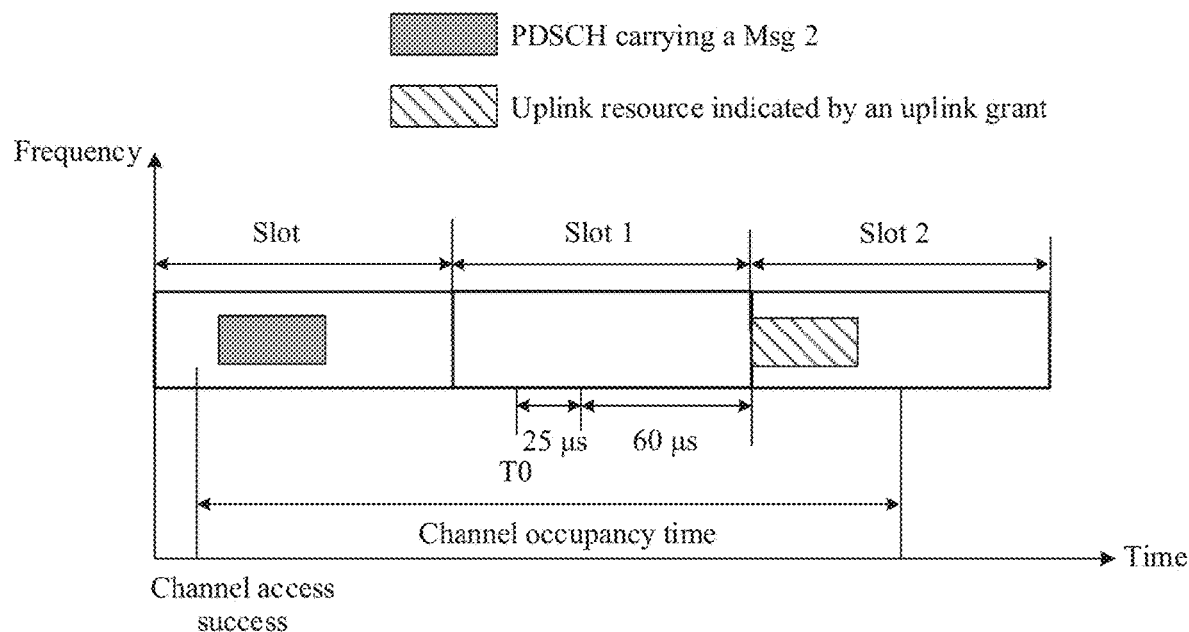
FIG. 10c is a schematic diagram of a start moment at which a terminal device performs channel access according to an embodiment of this application.

If the terminal device determines that the values of the two bits in the indication information 3 in the Msg 2 are '01', the terminal device may determine the duration of the extension based on C3*symbol length—16 μs—TA, and determine, based on the fixed duration, the duration of the extension, and a start moment of the uplink resource, a start moment for performing channel access. For example, as shown in FIG. 10c, the fixed duration is 25 μs, and the duration of the extension is 60 μs. In this case, the start moment (which is represented as T0) for performing channel access is 85 μs ahead of the start moment of the uplink resource. After determining the start moment for performing channel access, the terminal device may perform channel access based on the channel access type and the fixed duration that are indicated by the indication information 3, to send the uplink message on the extension and the uplink resource after the channel access succeeds.

If the terminal device determines that the values of the two bits in the indication information 3 in the Msg 2 are '10', the terminal device may determine the duration of the extension based on C1*symbol length—25 μs, and determine, based on the fixed duration, the duration of the extension, and a start moment of the uplink resource, a start moment for performing channel access. After determining the start moment for performing channel access, the terminal device may perform channel access based on the channel access type and the fixed duration that are indicated by the indication information 3, to send the uplink message on the extension and the uplink resource after the channel access succeeds.

If the terminal device determines that the values of the two bits in the indication information 3 in the Msg 2 are '11', the terminal device may perform channel access based on Category 4. A specific implementation of this manner may depend on the terminal device, and is not specifically limited.

In this embodiment of this application, information carried in the cyclic prefix extension may be a signal at the end of the first symbol of the uplink resource. To be specific, a signal having a suitable duration at the end of the first symbol of the uplink resource may be moved to a duration between a moment at which channel access is completed and a start moment of the first symbol of the uplink resource, to fill up the duration of the extension. This effectively avoids the following case: A channel is occupied by another device because the terminal device does not use the channel in a timely manner after successfully performing channel access.

Step 904: The network device receives the Msg 3, and sends a contention resolution message (contention resolution message, CRM) to the terminal device. Accordingly, the terminal device may receive the contention resolution message from the network device, where the contention resolution message is also referred to as a fourth message or a message 4 (Msg 4).

Herein, when sending the contention resolution message to the terminal device, the network device may scramble, by using the TC-RNTI, DCI for scheduling the contention resolution message. Accordingly, after detecting, through monitoring, the DCI scrambled by using the TC-RNTI, the terminal device may receive the contention resolution message based on the DCI, and perform matching between a contention resolution identifier (contention resolution identifier, CRID) in the contention resolution message and a part of information carried in the Msg 3. If the matching succeeds, the terminal device considers that contention resolution succeeds, that is, the random access succeeds. Otherwise, the terminal device considers that the random access fails.

Case 2: The random access process is the two-step random access process.

Figure 11:
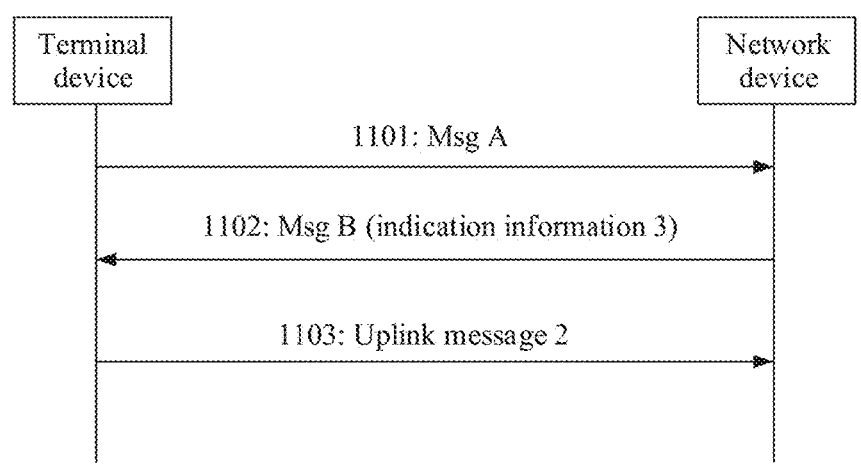
FIG. 11 is another schematic flowchart corresponding to a communication method according to Embodiment 3 of this application.

The following describes a possible implementation procedure with reference to FIG. 11.

FIG. 11 is another schematic flowchart corresponding to a communication method according to Embodiment 3 of this application. As shown in FIG. 11, the method includes the following steps.

Step 1101: A terminal device sends a Msg A to a network device.

Herein, the Msg A may also be referred to as a message A. and includes a random access preamble and an uplink message 1. For example, the Msg A is equivalent to the Msg 1 and the Msg 3 in the four-step random access process in FIG. 9, which may also be understood as "sending the Msg 1 and the Msg 3 together".

Step 1102: The network device sends a Msg B to the terminal device.

Step 1103: The terminal device sends an uplink message 2 to the network device based on the Msg B, where the uplink message 2 may be carried on a PUCCH or a PUSCH.

Herein, the Msg B is response information for the Msg A, may also be referred to as a message B. and is carried on a PDSCH. The Msg B may include a fallback random access response (fallbackRAR) or a success random access response (successRAR). In other words, the network device may send the fallbackRAR or the successRAR to the terminal device. For example, if the network device successfully decodes the random access preamble and the uplink message 1, the network device sends the successRAR to the terminal device. If the network device successfully decodes the random access preamble but fails to decode the uplink message 1, the network device sends the fallbackRAR to the terminal device.

The following should be noted: (1) If the network device sends the successRAR to the terminal device, the terminal device may send HARQ feedback information for the successRAR, namely, a HARQ acknowledgment (acknowledgment, ACK) to the network device, where the HARQ ACK is for notifying the network device that the successRAR has been successfully decoded. In this case, the uplink message 2 includes the HARQ feedback information, and the uplink message 2 may be carried on the PUCCH.

(2) If the network device sends the fallbackRAR to the terminal device, the terminal device may re-send the uplink message 1 to the network device based on the fallbackRAR. In this case, the uplink message 2 may be the retransmitted uplink message 1. In other words, the uplink message 2 may be the same as the uplink message 1, and the uplink message 1 may be carried on the PUSCH. Further, after receiving the uplink message 1 re-sent by the terminal device, if successfully decoding the uplink message 1, the network device may send a contention resolution identifier to the terminal device. The terminal device may determine, upon receiving the contention resolution identifier, that random access is completed: otherwise, the network device may send DCI to the terminal device, where the DCI is for scheduling retransmission of the uplink message 1.

For example, the fallbackRAR may include a timing advance command, an uplink grant, and a TC-RNTI. FIG. 12a is an example of a possible format of the fallbackRAR. As shown in FIG. 12a, the fallbackRAR includes four fields (fields), which are respectively referred to as a field 1, a field 2, a field 3, and a field 4. The field 1 is for carrying the timing advance command, the field 2 is for carrying the uplink grant, the field 3 is for carrying the TC-RNTI, and the field 4 is for carrying a reserved (reserved) bit. Further, the fallbackRAR may include seven octets (octets, Octs), the field 4 is located in an oct 1, the field 1 is located in the oct 1 and an oct 2, the field 2 is located in the oct 2, an oct 3, an oct 4, and an oct 5, and the field 3 is located in an oct 6 and an oct 7.

The successRAR may include a timing advance command, a C-RNTI, a contention resolution identifier, a transmit power control (transmitting power control, TPC), a hybrid automatic repeat request (hybrid automatic repeat request, HARQ) feedback time sequence indication, and a PUCCH resource indication. FIG. 12b is an example of a possible format of the successRAR. As shown in FIG. 12b, the successRAR may include seven fields, which are respectively referred to as a field 1, a field 2, a field 3, a field 4, a field 5, a field 6, and a field 7. The field 1 is for carrying the timing advance command, the field 2 is for carrying the C-RNTI, the field 3 is for carrying the contention resolution identifier, the field 4 is for carrying the transmit power control, the field 5 is for carrying the HARQ feedback time sequence indication, the field 6 is for carrying the PUCCH resource indication, and the field 7 is for carrying a reserved bit. Further, the successRAR includes 11 octs, the field 3 is located in an oct 1, an oct 2, an oct 3, an oct 4, an oct 5, and an oct 6, the field 7, the field 4, and the field 5 are located in an oct 7, the field 6 is located in an oct 8, the field 1 is located in the oct 8 and an oct 9, and the field 2 is located in an oct 10 and an oct 11.

Further, the fallbackRAR or the successRAR may further include indication information 3. For descriptions of the indication information 3, refer to the foregoing descriptions. It may be understood that an example in which the fallbackRAR or the successRAR includes the indication information 3 is used herein. In another possible example, the fallbackRAR or the successRAR may include indication information 1 and indication information 2, or the fallbackRAR or the successRAR includes indication information 1. For example, for the fallbackRAR, the indication information 3 may be carried in at least one of the field 1, the field 2, the field 3, and the field 4. For example, the indication information 3 may be carried in the field 2, in other words, the indication information 3 may be carried in the uplink grant. For the successRAR, the indication information 3 may be carried in at least one of the field 1, the field 2, the field 3, the field 4, the field 5, the field 6, and the field 7. For example, the indication information 3 may be carried in the field 7. As shown in FIG. 12c, the field 7 includes three bits, the indication information 3 may occupy two of the three bits, and the remaining bit is still the reserved bit.

For example, for an implementation of sending, by the terminal device, the uplink message 2 to the network device based on the Msg B in step 1103, refer to the foregoing implementation of sending, by the terminal device, the uplink message to the network device based on the Msg 2 in step 903. For example, if the terminal device determines that values of the two bits in the indication information 3 in the Msg B are '00', the terminal device may not perform channel access, and may determine a duration of extension based on C2*symbol length—16 μs—TA, to send the uplink message 2 on the extension and an uplink resource. Other cases are not described one by one.

According to the foregoing method, if a remaining channel occupancy time of the network device is sufficient, the network device may share the remaining time of the network device with the terminal device, and indicate the terminal device to perform channel access based on Category 1 or Category 2, so that resource utilization of an unlicensed spectrum can be effectively improved. If a remaining channel occupancy time of the network device is insufficient, the network device may indicate the terminal device to perform channel access based on Category 4 to obtain the channel occupancy time.

For Embodiment 1 to Embodiment 3, the following should be noted: (1) The possible solutions described in Embodiment 1 to Embodiment 3 may be separately implemented in different scenarios, or may be jointly implemented in a same scenario. For example, in the carrier aggregation scenario, when the BWP of the primary component carrier of the terminal device is switched, the solution described in FIG. 6 in Embodiment 1 may be used. When the secondary component carrier of the terminal device is activated, the solution described in FIG. 7 may be used.

(2) In the methods provided in embodiments of this application, for example, the terminal device switches a search space group after performing uplink transmission, this solution may be used as a supplement to an existing solution (namely, switching between a search space group 1 and a search space group 2 based on DCI and a timer), or may be independently implemented.

(3) Step numbers in the flowcharts (for example, FIG. 5, FIG. 6, FIG. 7, FIG. 8, FIG. 9, or FIG. 11) described in embodiments of this application are merely an example of an execution procedure, and do not constitute any limitation on an execution sequence of the steps. In embodiments of this application, there is no strict execution sequence between steps that have no time sequence dependency relationship with each other.

The foregoing mainly describes the solutions provided in embodiments of this application from a perspective of interaction between a network device and a terminal device. It may be understood that, to implement the foregoing functions, the network device or the terminal device may include a corresponding hardware structure and/or a software module for performing each function. A person skilled in the art should be easily aware that, in combination with units and algorithm steps of the examples described in embodiments disclosed in this specification, embodiments of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, division into function units may be performed on the terminal device and the network device based on the foregoing method examples. For example, division into each function unit may be based on each corresponding function, or two or more functions may be integrated into one unit. The integrated unit may be implemented in a form of hardware, or may be implemented in a form of a software function unit.

Figure 13:
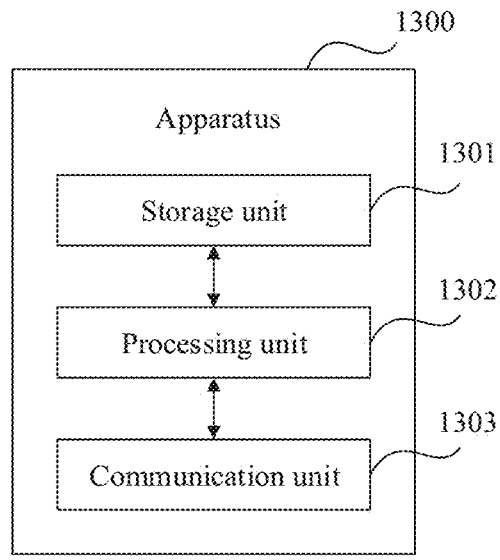
FIG. 13 is a possible example block diagram of an apparatus according to an embodiment of this application.

When an integrated unit is used, FIG. 13 is a possible example block diagram of an apparatus according to an embodiment of this application. As shown in FIG. 13, an apparatus 1300 may include a processing unit 1302 and a communication unit 1303. The processing unit 1302 is configured to control and manage an action of the apparatus 1300. The communication unit 1303 is configured to support communication between the apparatus 1300 and another device. Optionally, the communication unit 1303 is also referred to as a transceiver unit, and may include a receiving unit and/or a sending unit, respectively configured to perform a receiving operation and a sending operation. The apparatus 1300 may further include a storage unit 1301, configured to store program code and/or data of the apparatus 1300.

The apparatus 1300 may be the terminal device in any one of the foregoing embodiments, or may be a chip disposed in the terminal device. The processing unit 1302 may support the apparatus 1300 in performing actions of the terminal device in the foregoing method examples. Alternatively, the processing unit 1302 mainly performs an internal action of the terminal device in the method examples, and the communication unit 1303 may support communication between the apparatus 1300 and a network device. For example, the communication unit 1303 may be configured to perform step 502 and step 504 in FIG. 5, and the processing unit 1302 is configured to perform step 505, step 506, and step 507 in FIG. 5.

Specifically, in an embodiment, the communication unit 1303 is configured to: receive first configuration information from a network device, where the first configuration information is for configuring a first search space and a second search space of a first frequency domain resource, and the first search space and the second search space of the first frequency domain resource are for monitoring DCI in a same format. The processing unit 1302 is configured to: activate the first frequency domain resource, and monitor the DCI on the first frequency domain resource based on the first search space of the first frequency domain resource.

In a possible design, a periodicity of the first search space is less than a periodicity of the second search space.

In a possible design, the first frequency domain resource is a first BWP.

In a possible design, the processing unit 1302 is specifically configured to switch an activated BWP from a second BWP to the first BWP.

In a possible design, the processing unit 1302 is specifically configured to: determine that random access needs to be initiated, and switch the activated BWP from the second BWP to the first BWP, where a random access resource is not configured for the second BWP, and a random access resource is configured for the first BWP, or determine that a quantity of consistent channel access failures that occur on the second BWP is greater than or equal to a first threshold, and switch the activated BWP from the second BWP to the first BWP.

In a possible design, the communication unit 1303 is further configured to: receive second configuration information from the network device, where the second configuration information is for configuring a first search space and a second search space of the second BWP, and the first search space and the second search space of the second BWP are for monitoring the DCI in the same format. Before that the processing unit 1302 switches an activated BWP from a second BWP to the first BWP, the processing unit 1302 is further configured to: determine to monitor the DCI on the second BWP based on the second search space of the second BWP, and start a timer; and stop the timer in response to the switching.

In a possible design, the first BWP and the second BWP are located in a primary component carrier of the terminal device.

In a possible design, the first frequency domain resource is a secondary component carrier of the terminal device.

In a possible design, the processing unit 1302 is further configured to: determine to perform monitoring on the secondary component carrier based on the second search space, and start a timer; and stop the timer in response to deactivation of the secondary component carrier.

In another embodiment, the communication unit 1303 is configured to: receive configuration information from a network device, where the configuration information is for configuring a first search space and a second search space, and the first search space and the second search space are for monitoring DCI in a same format. The processing unit 1302 is configured to: monitor the DCI based on the first search space, and monitor the DCI based on the second search space in response to uplink transmission of the apparatus 1300.

In a possible design, the uplink transmission includes at least one of the following: sending a random access request, sending information on a configured grant resource, and sending a scheduling request.

In a possible design, the processing unit 1302 is further configured to; start a timer in response to the uplink transmission of the terminal device.

In a possible design, the processing unit 1302 is further configured to: if the timer expires, perform monitoring based on the first search space.

In still another embodiment, the communication unit 1303 is configured to: send a random access request to a network device; receive a response to the random access request, where the response includes first indication information; and send an uplink message to the network device based on the first indication information, where the uplink message is carried on a PUSCH or a PUCCH.

In a possible design, the first indication information indicates not to perform channel access.

In a possible design, the first indication information indicates that a channel access type is channel access without random back-off or channel access with random back-off with variable size of contention window. The processing unit 1302 controls the communication unit 1303 to perform channel access based on the channel access type indicated by the first indication information, and send the uplink message to the network device after channel access succeeds.

In a possible design, when the channel access type is the channel access without random back-off, the first indication information further indicates a first duration or a second duration.

In a possible design, the first symbol of a time domain resource in which the uplink message is located includes cyclic prefix extension.

In a possible design, the communication unit 1303 is further configured to: receive second indication information from the network device, where the second indication information indicates a duration of the extension.

In a possible design, the random access response includes an uplink grant and a timing advance command, where the uplink grant is for indicating an uplink resource, and the timing advance command is for indicating a timing advance.

The duration of the extension satisfies the following formula:

$$T=C*T1-T2-T3 \text{ or } T=C*T1-T2.$$

T is the duration of the extension, T1 is a length of a symbol, T2 is the first duration or the second duration, and T3 is the timing advance.

The apparatus 1300 may further be the network device in any one of the foregoing embodiments, or may be a chip disposed in the network device. The processing unit 1302 may support the apparatus 1300 in performing actions of the network device in the foregoing method examples. Alternatively, the processing unit 1302 mainly performs an internal action of the network device in the method examples, and the communication unit 1303 may support communication between the apparatus 1300 and a terminal device.

Specifically, in an embodiment, the communication unit 1303 is configured to: receive a random access request from a terminal device, and send, to the terminal device, a response to the random access request, where the response includes first indication information, and the first indication information is used by the terminal device to send an uplink message.

In a possible design, the first indication information indicates not to perform channel access, the first indication information indicates that a channel access type is channel access without random back-off, or the first indication information indicates that a channel access type is channel access with random back-off with variable size of contention window.

In a possible design, when the channel access type is the channel access without random back-off, the first indication information further indicates a first duration or a second duration.

In a possible design, the first symbol of a time domain resource in which the uplink message is located includes cyclic prefix extension.

In a possible design, the communication unit 1303 is further configured to: send second indication information to the terminal device, where the second indication information indicates a duration of the extension.

In a possible design, the random access response includes an uplink grant and a timing advance command, where the uplink grant is for indicating an uplink resource, and the timing advance command is for indicating a timing advance. The duration of the extension satisfies the following formula:

$$T=C*T1-T2-T3 \text{ or } T=C*T1-T2.$$

T is the duration of the extension, T1 is a length of a symbol, T2 is the first duration or the second duration, and T3 is the timing advance.

It should be understood that division of units in the foregoing apparatus is merely logical function division. During actual implementation, all or some of the units may be integrated into one physical entity, or may be physically separated. In addition, all the units in the apparatus may be implemented by using software invoked by a processing element, or may be implemented by using hardware; or some units may be implemented by using software invoked by a processing element, and some units may be implemented by using hardware. For example, each unit may be a separately disposed processing element, or may be integrated into a chip of the apparatus for implementation. In addition, each unit may be stored in a memory in a form of a program, and a processing element of the apparatus invokes and executes a function of the unit. In addition, all or some of the units may be integrated together, or may be implemented independently. The processing element herein may also be a processor, and may be an integrated circuit having a signal processing capability. In an implementation process, the steps in the foregoing methods or the foregoing units may be implemented by using an integrated logic circuit of hardware in the processing element, or may be implemented by using software invoked by the processing element.

In an example, the unit in any one of the foregoing apparatuses may be one or more integrated circuits configured to implement the foregoing method, for example, one or more application-specific integrated circuits (Application-Specific Integrated Circuits, ASICs), one or more microprocessors (digital signal processors, DSPs), one or more field programmable gate arrays (Field Programmable Gate Arrays, FPGAs), or a combination of at least two of these integrated circuit forms. For another example, when the unit in the apparatus is implemented by scheduling a program by a processing element, the processing element may be a processor, for example, a central processing unit (central processing unit, CPU) or another processor that can invoke the program. For another example, these units may be integrated together and implemented in a form of a system-on-a-chip (system-on-a-chip, SOC).

The foregoing receiving unit is an interface circuit of the apparatus, and is configured to receive a signal from another apparatus. For example, when the apparatus is implemented by using a chip, the receiving unit is an interface circuit of the chip configured to receive a signal from another chip or apparatus. The foregoing sending unit is an interface circuit of the apparatus, and is configured to send a signal to another apparatus. For example, when the apparatus is implemented by using a chip, the sending unit is an interface circuit of the chip configured to send a signal to another chip or apparatus.

Figure 14:
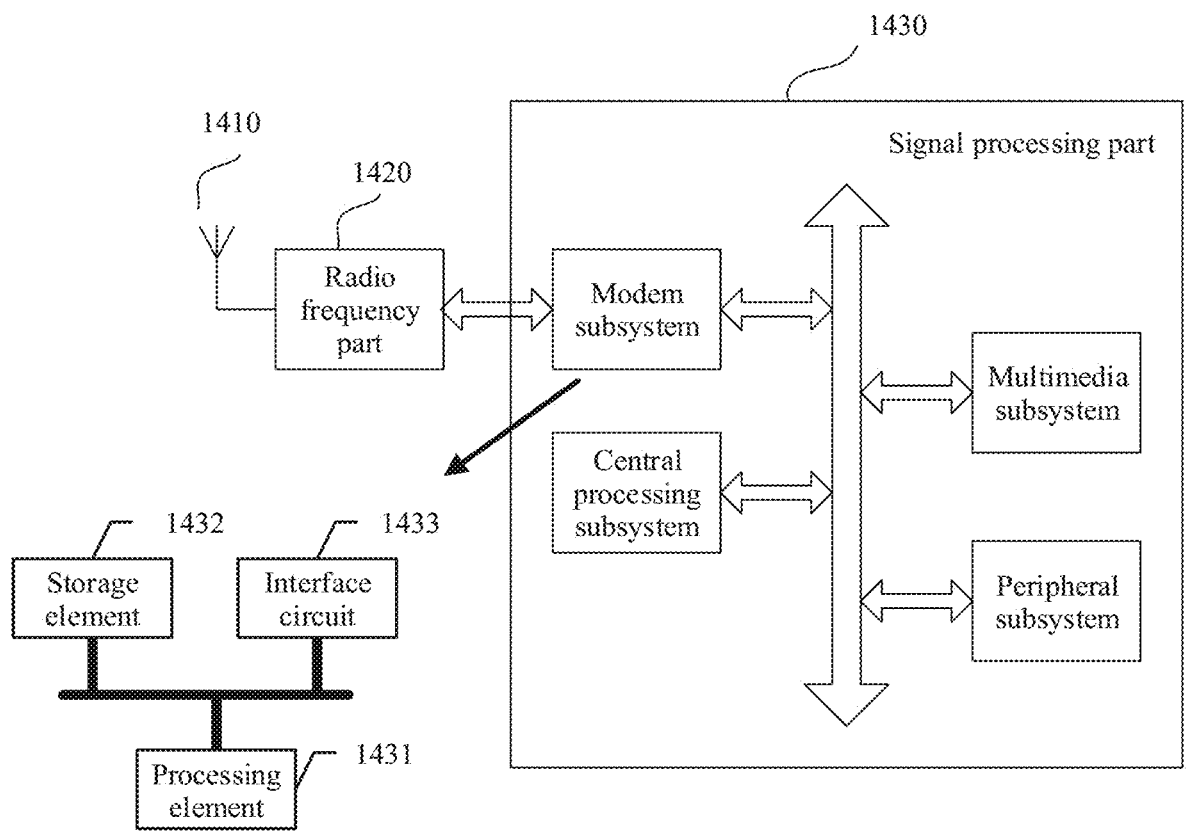
FIG. 14 is a schematic diagram of a structure of a terminal device according to an embodiment of this application.

FIG. 14 is a schematic diagram of a structure of a terminal device according to an embodiment of this application. The terminal device may be the terminal device in the foregoing embodiments, and may be configured to implement operations of the terminal device in the foregoing embodiments. As shown in FIG. 14, the terminal device includes an antenna 1410, a radio frequency part 1420, and a signal processing part 1430. The antenna 1410 is connected to the radio frequency part 1420. In a downlink direction, the radio frequency part 1420 receives, through the antenna 1410, information sent by a network device, and sends, to the signal processing part 1430 to process, the information sent by the network device. In an uplink direction, the signal processing part 1430 processes information from the terminal device, and sends the information to the radio frequency part 1420. The radio frequency part 1420 processes the information from the terminal device, and then sends the processed information to the network device through the antenna 1410.

The signal processing part 1430 may include a modem subsystem, configured to process data at each communication protocol layer. The signal processing part 1430 may further include a central processing subsystem, configured to process an operating system and an application layer of the terminal device. In addition, the signal processing part 1430 may further include another subsystem, for example, a multimedia subsystem or a peripheral subsystem. The multimedia subsystem is configured to control a camera, a screen display, and the like of the terminal device. The peripheral subsystem is configured to connect to another device. The modem subsystem may be a chip that is separately disposed.

The modem subsystem may include one or more processing elements 1431, for example, include one main control CPU and another integrated circuit. In addition, the modem subsystem may further include a storage element 1432 and an interface circuit 1433. The storage element 1432 is configured to store data and a program. However, the program used to perform the methods performed by the terminal device in the foregoing methods may not be stored in the storage element 1432, but is stored in a memory outside the modem subsystem, and is loaded and used by the modem subsystem when to be used. The interface circuit 1433 is configured to communicate with another subsystem.

The modem subsystem may be implemented by a chip. The chip includes at least one processing element and an interface circuit. The processing element is configured to perform the steps of any method performed by the foregoing terminal device. The interface circuit is configured to communicate with another apparatus. In an implementation, units in the terminal device for implementing the steps in the foregoing methods may be implemented in a form of scheduling a program by a processing element. For example, the apparatus used in the terminal device includes a processing element and a storage element. The processing element invokes a program stored in the storage element, to perform the methods performed by the terminal device in the foregoing method embodiments. The storage element may be a storage element located on a same chip as the processing element, namely, an on-chip storage element.

In another implementation, a program used to perform the method performed by the terminal device in the foregoing methods may be in a storage element that is on a different chip from the processing unit, namely, an off-chip storage element. In this case, the processing element invokes or loads the program from the off-chip storage element to the on-chip storage element, to invoke and perform the methods performed by the terminal device in the foregoing method embodiments.

In still another implementation, units in the terminal device for implementing the steps in the foregoing methods may be configured as one or more processing elements. These processing elements are disposed in the modem subsystem. The processing element herein may be an integrated circuit, for example, one or more ASICs, one or more DSPs, one or more FPGAs, or a combination of these types of integrated circuits. These integrated circuits may be integrated together to form a chip.

Units in the terminal device for implementing the steps in the foregoing methods may be integrated together, and implemented in a form of an SOC. The SOC chip is configured to implement the foregoing methods. At least one processing element and storage element may be integrated into the chip, and the processing element invokes a program stored in the storage element to implement the foregoing methods performed by the terminal device. Alternatively, at least one integrated circuit may be integrated into the chip, to implement the foregoing methods performed by the terminal device. Alternatively, with reference to the foregoing implementations, functions of some units may be implemented by invoking a program by the processing element, and functions of some units may be implemented by the integrated circuit.

It can be learned that the foregoing apparatus used in the terminal device may include at least one processing element and an interface circuit. The at least one processing element is configured to perform any one of the methods that are provided in the foregoing method embodiments and performed by the terminal device. The processing element may perform some or all steps performed by the terminal device, in a first manner, to be specific, by invoking the program stored in the storage element; or may perform some or all steps performed by the terminal device, in a second manner, to be specific, by using a hardware integrated logic circuit in the processing element in combination with instructions; or may certainly perform, by combining the first manner and the second manner, some or all steps performed by the terminal device.

The processing element herein is the same as that described above, and may be implemented by using a processor. A function of the processing element may be the same as a function of the processing unit described in FIG. 13. For example, the processing element may be a general-purpose processor, for example, a CPU, or may be one or more integrated circuits, for example, one or more ASICs, one or more microprocessors DSPs, one or more FPGAs, or a combination of at least two of these types of integrated circuits, configured to implement the foregoing methods. The storage element may be implemented by using a memory. A function of the storage element may be the same as a function of the storage unit described in FIG. 13. The storage element may be implemented by using a memory. A function of the storage element may be the same as a function of the storage unit described in FIG. 13. The storage element may be one memory, or an umbrella term of a plurality of memories.

The terminal device shown in FIG. 14 can implement the processes related to the terminal device in the method embodiment shown in FIG. 5, FIG. 6, FIG. 7, FIG. 8, FIG. 9, or FIG. 11. Operations and/or functions of the modules in the terminal device shown in FIG. 14 are intended to implement the corresponding procedures in the foregoing method embodiments. For details, refer to the descriptions in the foregoing method embodiments. To avoid repetition, detailed descriptions are properly omitted herein.

Figure 15:
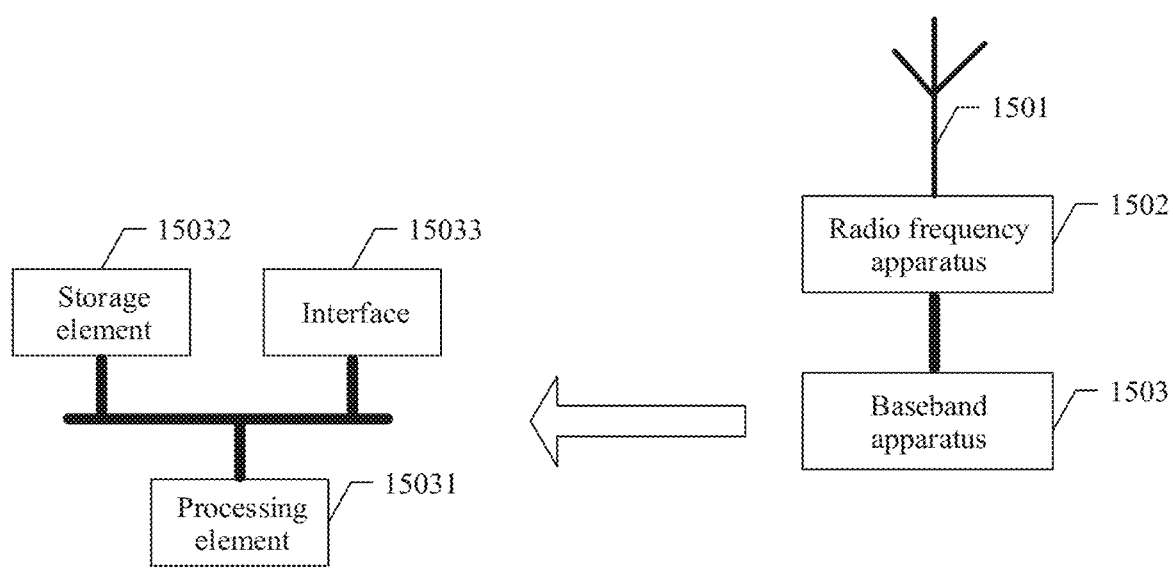
FIG. 15 is a schematic diagram of a structure of a network device according to an embodiment of this application.

FIG. 15 is a schematic diagram of a structure of a network device according to an embodiment of this application. The network device is configured to implement the operations of the network device in the foregoing embodiments. As shown in FIG. 15, the network device includes an antenna 1501, a radio frequency apparatus 1502, and a baseband apparatus 1503. The antenna 1501 is connected to the radio frequency apparatus 1502. In an uplink direction, the radio frequency apparatus 1502 receives, through the antenna 1501, information sent by a terminal device, and sends, to the baseband apparatus 1503 to process, the information sent by the terminal device. In a downlink direction, the baseband apparatus 1503 processes information of the terminal device, and sends the information to the radio frequency apparatus 1502. The radio frequency apparatus 1502 processes the information of the terminal device, and then sends the processed information to the terminal device through the antenna 1501.

The baseband apparatus 1503 may include one or more processing elements 15031, for example, include one main control CPU and another integrated circuit. In addition, the baseband apparatus 1503 may further include a storage element 15032 and an interface 15033. The storage element 15032 is configured to store a program and data. The interface 15033 is configured to exchange information with the radio frequency apparatus 1502, and the interface is, for example, a common public radio interface (common public radio interface, CPRI). The foregoing apparatus used in the network device may be located in the baseband apparatus 1503. For example, the foregoing apparatus used in the network device may be a chip on the baseband apparatus 1503. The chip includes at least one processing element and an interface circuit. The processing element is configured to perform the steps in any one of the methods performed by the network device. The interface circuit is configured to communicate with another apparatus. In an implementation, units in the network device for implementing the steps in the foregoing methods may be implemented in a form of scheduling a program by a processing element. For example, the apparatus used in the network device includes a processing element and a storage element. The processing element invokes a program stored in the storage element, to perform the method performed by the network device in the foregoing method embodiments. The storage element may be a storage element that is located on a same chip as the processing element, namely, an on-chip storage element, or may be a storage element that is located on a different chip from the processing element, namely, an off-chip storage element.

In another implementation, units in the network device for implementing the steps in the foregoing methods may be configured as one or more processing elements. These processing elements are disposed on the baseband apparatus. The processing element herein may be an integrated circuit, for example, one or more ASICs, one or more DSPs, one or more FPGAs, or a combination of these types of integrated circuits. These integrated circuits may be integrated together to form a chip.

The units in the network device for implementing the steps in the foregoing methods may be integrated together, and implemented in a form of a system-on-a-chip (system-on-a-chip, SOC). For example, the baseband apparatus includes the SOC chip, and is configured to implement the foregoing methods. At least one processing element and storage element may be integrated into the chip, and the processing element invokes a program stored in the storage element, to implement the foregoing methods performed by the network device. Alternatively, at least one integrated circuit may be integrated into the chip, to implement the foregoing methods performed by the network device. Alternatively, with reference to the foregoing implementations, functions of some units may be implemented by invoking a program by the processing element, and functions of some units may be implemented by the integrated circuit.

It can be learned that the foregoing apparatus used in the network device may include at least one processing element and an interface circuit. The at least one processing element is configured to perform any one of the methods that are provided in the foregoing method embodiments and performed by the network device. The processing element may perform some or all steps performed by the network device, in a first manner, to be specific, by invoking the program stored in the storage element; or may perform some or all steps performed by the network device, in a second manner, to be specific, by using a hardware integrated logic circuit in the processing element in combination with instructions; or may certainly perform, by combining the first manner and the second manner, some or all steps performed by the network device.

The processing element herein is the same as that described above, and may be implemented by using a processor. A function of the processing element may be the same as a function of the processing unit described in FIG. 13. For example, the processing element may be a general-purpose processor, for example, a CPU, or may be one or more integrated circuits, for example, one or more ASICs, one or more microprocessors DSPs, one or more FPGAs, or a combination of at least two of these types of integrated circuits, configured to implement the foregoing methods. The storage element may be implemented by using a memory. A function of the storage element may be the same as a function of the storage unit described in FIG. 13. The storage element may be implemented by using a memory. A function of the storage element may be the same as a function of the storage unit described in FIG. 13. The storage element may be one memory, or an umbrella term of a plurality of memories.

The network device shown in FIG. 15 can implement the processes related to the network device in the method embodiment shown in FIG. 5, FIG. 6, FIG. 7, FIG. 8, FIG. 9, or FIG. 11. Operations and/or functions of the modules in the network device shown in FIG. 15 are intended to implement the corresponding procedures in the foregoing method embodiments. For details, refer to the descriptions in the foregoing method embodiments. To avoid repetition, detailed descriptions are properly omitted herein.

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In an implementation process, the steps in the methods in embodiments may be completed by using a hardware integrated logical circuit in the processor, or by using instructions in a form of software. The steps in the methods disclosed with reference to embodiments of this application may be directly performed by a hardware processor, or may be performed by using a combination of hardware in the processor and a software module.

It should be noted that the memory or storage unit in embodiments of this application may be a volatile memory or a non-volatile memory, or may include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. By way of example but not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and method described in this specification includes but is not limited to these memories and any memory of another appropriate type.

All or some of the foregoing embodiments may be implemented by using software, hardware, firmware, or any combination thereof. When software is used to implement embodiments, all or some of the embodiments may be implemented in a form of a computer program product. The computer program product includes one or more computer programs or instructions. When the computer programs or the instructions are loaded and executed on a computer, the procedures or the functions according to embodiments of this application are all or partially implemented. The computer may be a general-purpose computer, a dedicated computer, a computer network, or another programmable apparatus. The computer programs or the instructions may be stored in a computer-readable storage medium, or may be transmitted by using the computer-readable storage medium. The computer-readable storage medium may be any usable medium accessible by a computer, or a data storage device such as a server integrating one or more usable media. The usable medium may be a magnetic medium, for example, a floppy disk, a hard disk, or a magnetic tape; or may be an optical medium, for example, a DVD; or may be a semiconductor medium, for example, a solid-state drive (solid-state drive, SSD).

Various illustrative logical units and circuits described in embodiments of this application may implement or operate the described functions by using a general-purpose processor, a digital signal processor, an application-specific integrated circuit (ASIC), a field programmable gate array (FPGA), another programmable logical apparatus, a discrete gate or transistor logic, a discrete hardware component, or any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a RAM, a flash memory, a ROM, an EPROM, an EEPROM, a register, a hard disk, a removable magnetic disk, a CD-ROM, or a storage medium of any other form in the art. For example, the storage medium may connect to a processor, so that the processor can read information from the storage medium and write information into the storage medium. Optionally, the storage medium may alternatively be integrated into the processor. The processor and the storage medium may be arranged in the ASIC, and the ASIC may be arranged in a terminal device. Optionally, the processor and the storage medium may alternatively be arranged in different components of the terminal device.

These computer program instructions may alternatively be loaded onto the computer or the another programmable data processing device, so that a series of operation steps are performed on the computer or the another programmable device to generate computer-implemented processing, and instructions executed on the computer or the another programmable device provide steps for implementing a function specified in one or more procedures in the flowchart and/or one or more blocks in the block diagram.

Although embodiments of this application are described with reference to specific features, it is clear that various modifications and combinations may be made to them without departing from the spirit and scope of embodiments of this application. Correspondingly, the specification and accompanying drawings are merely example descriptions of embodiments of this application that are defined by the appended claims, and are considered to cover any or all of modifications, variations, combinations, or equivalents in the scope of embodiments of this application.

What is claimed is:

1. A communication method, wherein the method comprises:
sending a random access request to a network device;
receiving a random access response to the random access request, wherein the random access response comprises first indication information and second indication information, wherein the second indication information indicates a duration of a cyclic prefix extension;
sending an uplink message to the network device based on the first indication information, wherein the uplink message is carried on a physical uplink shared channel (PUSCH) or a physical uplink control channel (PUCCH); and wherein the first indication information indicates that a channel access type is channel access without random back-off or channel access with random back-off with variable size of contention window.

2. The method according to claim 1, wherein the first indication information indicates that the channel access type is channel access without random back-off or channel access with random back-off with variable size of contention window; and the sending an uplink message to the network device based on the first indication information comprises:
performing channel access based on the channel access type indicated by the first indication information; and
sending the uplink message to the network device after the channel access succeeds.

3. The method according to claim 2, wherein when the channel access type is the channel access without random back-off, the first indication information further indicates a first duration or a second duration.

4. The method according to claim 1, wherein a first symbol of a time domain resource in which the uplink message is located comprises the cyclic prefix extension.

5. The method according to claim 4, wherein the random access response comprises an uplink grant and a timing advance command, the uplink grant is for indicating an uplink resource, and the timing advance command is for indicating a timing advance; and a duration of the cyclic prefix extension satisfies the following formula:

$$T=C*T1-T2-T3 \text{ or } T=C*T1-T2, \text{ wherein}$$

T is the duration of the cyclic prefix extension, T1 is a length of a symbol, T2 is a first duration or a second duration, and T3 is the timing advance.

6. A communication method, wherein the method comprises:

receiving a random access request from a terminal device;
sending a random access response to the random access request, wherein the random access response comprises first indication information and second indication information, wherein the second indication information indicates a duration of a cyclic prefix extension;
receiving an uplink message from the terminal device, wherein the uplink message is carried on a physical uplink shared channel (PUSCH) or a physical uplink control channel (PUCCH); and
wherein the first indication information indicates that a channel access type is channel access without random back-off or channel access with random back-off with variable size of contention window.

7. The method according to claim 6, wherein the first indication information indicates that the channel access type is channel access without random back-off or channel access with random back-off with variable size of contention window; and the receiving an uplink message from the terminal device comprises:
receiving an uplink message from the terminal device after the channel access succeeds.

8. The method according to claim 7, wherein when the channel access type is the channel access without random back-off, the first indication information further indicates a first duration or a second duration.

9. The method according to claim 6, wherein a first symbol of a time domain resource in which the uplink message is located comprises the cyclic prefix extension.

10. The method according to claim 9, wherein the random access response comprises an uplink grant and a timing advance command, the uplink grant is for indicating an uplink resource, and the timing advance command is for indicating a timing advance; and a duration of the cyclic prefix extension satisfies the following formula:

$$T=C*T1-T2-T3 \text{ or } T=C*T1-T2, \text{ wherein}$$

T is the duration of the cyclic prefix extension, T1 is a length of a symbol, T2 is a first duration or a second duration, and T3 is the timing advance.

11. An apparatus, comprising:
one or more processors;
a non-transitory memory coupled to the one or more processors, wherein the non-transitory memory stores a program to be executed by the one or more processors, the program including instructions for:
sending a random access request to a network device;
receiving a random access response to the random access request, wherein the random access response comprises first indication information and second indication information, wherein the second indication information indicates a duration of a cyclic prefix extension;
sending an uplink message to the network device based on the first indication information, wherein the uplink message is carried on a physical uplink shared channel (PUSCH) or a physical uplink control channel (PUCCH); and
wherein the first indication information indicates that a channel access type is channel access without random back-off or channel access with random back-off with variable size of contention window.

12. The apparatus according to claim 11, wherein the first indication information indicates that the channel access type is channel access without random back-off or channel access with random back-off with variable size of contention window; and the sending an uplink message to the network device based on the first indication information comprises:
performing channel access based on the channel access type indicated by the first indication information; and
sending the uplink message to the network device after the channel access succeeds.

13. The apparatus according to claim 12, wherein when the channel access type is the channel access without random back-off, the first indication information further indicates a first duration or a second duration.

14. The apparatus according to claim 11, wherein a first symbol of a time domain resource in which the uplink message is located comprises the cyclic prefix extension.

15. An apparatus, comprising:
one or more processors;
a non-transitory memory coupled to the one or more processors, wherein the non-transitory memory stores a program to be executed by the one or more processors, the program including instructions for:
receiving a random access request from a terminal device;
sending a random access response to the random access request, wherein the random access response comprises first indication information and second indication information, wherein the second indication information indicates a duration of a cyclic prefix extension;

receiving an uplink message from the terminal device, wherein the uplink message is carried on a physical uplink shared channel (PUSCH) or a physical uplink control channel (PUCCH); and wherein the first indication information indicates that a channel access type is channel access without random back-off or channel access with random back-off with variable size of contention window.

16. The apparatus according to claim 15, wherein the first indication information indicates that the channel access type is channel access without random back-off or channel access with random back-off with variable size of contention window; and the receiving an uplink message from the terminal device comprises:

receiving an uplink message from the terminal device after the channel access succeeds.

17. The apparatus according to claim 16, wherein when the channel access type is the channel access without random back-off, the first indication information further indicates a first duration or a second duration.

18. The apparatus according to claim 15, wherein a first symbol of a time domain resource in which the uplink message is located comprises the cyclic prefix extension.

* * * * *